United States Patent
Kim

(10) Patent No.: US 10,108,289 B2
(45) Date of Patent: Oct. 23, 2018

(54) TOUCH PANEL, DISPLAY DEVICE AND METHOD OF DRIVING THE SAME

(71) Applicant: LG Display Co., Ltd., Seoul (KR)

(72) Inventor: Cheol Se Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 466 days.

(21) Appl. No.: 14/670,447

(22) Filed: Mar. 27, 2015

(65) Prior Publication Data

US 2015/0277655 A1 Oct. 1, 2015

(30) Foreign Application Priority Data

Mar. 27, 2014 (KR) .................. 10-2014-0036238
Mar. 31, 2014 (KR) .................. 10-2014-0037873
Mar. 23, 2015 (KR) .................. 10-2015-0040157

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ........ G06F 3/044; G06F 3/0412; G06F 3/041; G06F 3/0416
See application file for complete search history.

(56) References Cited

U.S. PATENT DOCUMENTS

| 7,859,521 B2 | 12/2010 | Hotelling et al. | |
|---|---|---|---|
| 2010/0110038 A1 | 5/2010 | Mo et al. | |
| 2010/0149108 A1 | 6/2010 | Hotelling et al. | |
| 2010/0321313 A1 | 12/2010 | Oda et al. | |
| 2011/0048813 A1* | 3/2011 | Yilmaz | G06F 3/044 178/18.06 |
| 2012/0274603 A1* | 11/2012 | Kim | G06F 3/0412 345/174 |
| 2012/0319974 A1 | 12/2012 | Kim et al. | |
| 2014/0022186 A1 | 1/2014 | Hong et al. | |
| 2014/0267137 A1* | 9/2014 | Solven | G06F 3/0416 345/174 |
| 2015/0035794 A1* | 2/2015 | Zhitomirskiy | G06F 3/044 345/174 |
| 2015/0268762 A1* | 9/2015 | Wang | G06F 3/0412 345/174 |

FOREIGN PATENT DOCUMENTS

| CN | 103257769 A | 8/2013 |
|---|---|---|
| EP | 2264576 A1 | 12/2010 |
| EP | 2538313 A1 | 12/2012 |
| WO | 2015/037853 A1 | 3/2015 |

\* cited by examiner

*Primary Examiner* — Lun-Yi Lao
*Assistant Examiner* — Johny Lau
(74) *Attorney, Agent, or Firm* — Morgan, Lewis & Bockius LLP

(57) ABSTRACT

A touch panel, a display device and a method of driving the same are provided. The touch panel, the display device and the method of driving the same, in which at least two sub receiving electrodes respectively configuring receiving electrodes insulated from each other are disposed between two sub-driving electrodes configuring one driving electrode.

24 Claims, 12 Drawing Sheets

TOUCH PANEL, DISPLAY DEVICE AND METHOD OF DRIVING THE SAME

CROSS-REFERENCE TO RELATED APPLICATIONS

This application claims the benefit of the Korean Patent Application No. 10-2014-0036238 filed on Mar. 27, 2014, No. 10-2014-0037873 filed on Mar. 31, 2014, and No. 10-2015-0040157 filed on Mar. 23, 2015, which are hereby incorporated by reference as if fully set forth herein.

BACKGROUND

Field of the Invention

The present invention relates to a touch panel, a display device and a method of driving the same, and more particularly, to a display device, in which a touch panel is provided in a panel, and a method of driving the same.

Discussion of the Related Art

Touch panels are a type of input device that is included in display devices such as liquid crystal display (LCD) devices, plasma display panels (PDPs), organic light emitting display device (OLED), and electrophoretic display devices (EPDs), and enables a user to input information by directly touching a screen with a finger, a pen or the like while looking at the screen of the display device.

A method of manufacturing LCD devices may include an add-on type, in which a panel displaying an image and a touch panel sensing a touch are manufactured independently from each other and then are attached to each other, and an in-cell type, in which the touch panel is built into the panel.

The demand for display devices with in-cell type touch panel for slimming portable terminals such as smart phones and tablet Personal Computers (PCs), is recently increasing.

In an in-cell type display device, as disclosed in U.S. Pat. No. 7,859,521, a plurality of common electrodes for display are segmented into a plurality of touch driving areas and touch sensing areas. An in-cell type display device allows a mutual capacitance to be generated between the touch driving area and the touch sensing area, and thus, measures the change in a mutual capacitance that occurs in touch to determines whether there is a touch.

In other words, the related art in-cell type display device simultaneously performs a display function and a touch function. To this end, in the related art in-cell type display device, during an image display period, a common voltage is supplied to common electrodes, and during a touch sensing period, a touch driving signal is supplied to the common electrodes.

In a related art in-cell type mutual capacitive display device using the common electrode, the common electrode is used as a driving electrode and a receiving electrode that are necessary for touch sensing, and an image display period and a touch sensing period are temporally divided.

Therefore, in the image display period, a driving electrode and a receiving electrode function as a common electrode. In the touch sensing period, a periodic driving pulse is applied to the driving electrode, and a touch driver determines whether there is a touch by using a sensing signal that is received through the receiving electrode.

FIG. 1 is an exemplary waveform diagram showing an image display period and a touch sensing period in a related art in-cell type display device.

In the related art in-cell type display device, as described above and as shown in FIG. 1, a period (hereinafter simply referred to as one frame period) corresponding to one frame is divided into an image display period (Display) and a touch sensing period (Touch).

A touch panel applied to the related art in-cell type display device includes a driving electrode, to which a common voltage is supplied during the image display period and a driving voltage is supplied during the touch sensing period, and a receiving electrode, to which a common voltage is supplied during the image display period and a reference voltage is supplied during the touch sensing period.

During the image display period, the common voltage is supplied to the driving electrode and the receiving electrode.

During the touch sensing period, a touch driving signal having a pulse shape is supplied to the driving electrode and a reference voltage is supplied to the receiving electrode.

In this case, when one frame period starts, the image display period is performed, and after the image display period, the touch sensing period is performed.

FIG. 2 is an exemplary diagram illustrating a configuration of a related art touch panel using a capacitance type, and particularly, a configuration of a mutual type touch panel.

The touch panel using the capacitance type includes driving electrodes (TX1 to TX6), to which a common voltage is supplied during the image display period and a touch driving signal is supplied during the touch sensing period, and receiving electrodes (RX1 to RX4), to which a common voltage is supplied during the image display period and a reference voltage is supplied during the touch sensing period. The number of the driving electrodes and the number of the receiving electrodes may be variously changed depending on a size and a shape of the touch panel.

For example, if the touch driving signal is sequentially supplied to the driving electrodes (TX1 to TX6), sensing signals are received through the receiving electrodes (RX1 to RX4). In this case, in order to increase an accuracy of detection of sensing signals, the touch driver respectively supplies a plurality of touch driving signals to the driving electrodes in a repeating manner, and accumulates the sensing signals corresponding to the touch driving signals, to determine whether the touch panel is touched.

The above-described display devices of the related art may have the following problems.

First, as a size of a display device comprising a touch panel increases, the number of driving electrodes provided in the touch panel increases, and for this reason, time taken in supplying the touch driving signal to the driving electrodes increases. Therefore, as a size of the touch panel increases, the time for sensing a touch decreases. For example, when it is assumed that one second is required for touch driving signals are sequentially supplied to ten driving electrodes, two seconds are required for touch driving signals are sequentially supplied to twenty driving electrodes when a touch panel having an increased size. Therefore, as a size of a touch panel increases, the frequency for determining a touch for one minute decreases, and thus, a touch sensing performance is decreased. This may identically occur in an add-on type display device in addition to an in-cell type display device.

Second, particularly, the in-cell type display device, one frame period is divided into the touch sensing period and the image display period, and a ratio of the touch sensing period and the image display period is set. Therefore, when it is assumed that the touch sensing period is determined and a touch panel having an increased size, a time for which a touch driving signal is supplied to each of driving electrodes has to be decreased In other words, the number of the touch driving signals supplied to each of the driving electrodes has to be decreased. Therefore, an in-cell type display device's touch sensitivity is decreased more than an add-on type display device.

Third, furthermore, in the in-cell type display device, various common noises are easily inputted to the driving electrode and the receiving electrode, and thus, the touch sensitivity can be further decreased. A common noise is similarly inputted into a driving electrode and a receiving electrode of a touch panel. Examples of common noise include noise caused by static electricity, noise generated when battery charger is connected to the display device for battery charging, noise generated by a display signal for a display device, and noise generated by a driving signal for a backlight of an LCD device, or the like.

Fourth, the noise has a specific frequency or a specific waveform, or may have a white noise characteristic. Therefore, to solve the common noise, various types of and difficult-to-implement noise signal processing filters need to be added, and thus, the processor's computation may increase.

Fifth, if a voltage of a touch driving signal is increased for enhancing a touch sensitivity, a power consumption may increase.

SUMMARY

Accordingly, the present invention is directed to a touch panel, a display device and a method of driving the same that substantially obviate one or more problems due to limitations and disadvantages of the related art.

An object of the present invention is directed to provide a touch panel, a display device and a method of driving the same, in which at least two sub receiving electrodes respectively configuring receiving electrodes insulated from each other are disposed between two sub driving electrodes configuring one driving electrode.

Another object of the present invention is directed to provide a touch panel, a display device and a method of driving the same, in which two sub receiving electrodes respectively configuring a pair of receiving electrodes insulated from each other are disposed between two sub driving electrodes configuring one driving electrode and the pair of receiving electrodes are connected to a differential amplifier to decrease a common noise.

Additional features and advantages of the invention will be set forth in part in the description which follows, and in part will be apparent from the description, or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a display device includes a panel that displays an image; a touch panel that includes a plurality of driving electrodes and a plurality of receiving electrodes; and a touch sensing unit that supplies a touch driving signal to the plurality of driving electrodes and by using a plurality of sensing signals respectively received from the plurality of receiving electrodes, determines whether there is a touch in the panel, wherein each of the plurality of driving electrodes comprises a plurality of sub driving electrodes which are disposed in a first direction of the panel and are connected to each other through a driving electrode line, each of the plurality of receiving electrodes comprises a plurality of sub receiving electrodes which are disposed in a second direction vertical to the first direction and are connected to each other through a receiving electrode line, and at least two sub receiving electrodes respectively configuring a plurality of receiving electrodes electrically insulated from each other are disposed between two sub driving electrodes configuring one driving electrode.

In another aspect, a method of driving a display device includes supplying a touch driving signal to each of a plurality of driving electrodes arranged in a first direction of a panel; when the touch driving signal is supplied to an nth driving electrode among the plurality of driving electrodes, receiving a plurality of sensing signals from at least two receiving electrodes disposed between two sub driving electrodes among a plurality of sub driving electrodes configuring the nth driving electrode; and analyzing the plurality of sensing signals to determine whether there is a touch in at least two positions, disposed along a second direction vertical to the first direction, between the two sub driving electrodes.

In another aspect, a touch panel includes: a driving electrode that includes a plurality of sub driving electrodes arranged in a first direction; and a receiving electrode that includes a plurality of sub receiving electrodes arranged in a second direction, wherein at least two sub receiving electrodes electrically insulated from each other are disposed between adjacent sub driving electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, embodiments of the present invention will be described in detail with reference to the accompanying drawings. In the following description, for convenience of description, an LCD device will be described as an example of the present invention, but the present invention is not limited thereto. That is, the present invention may be applied to various display devices.

Figure 3:
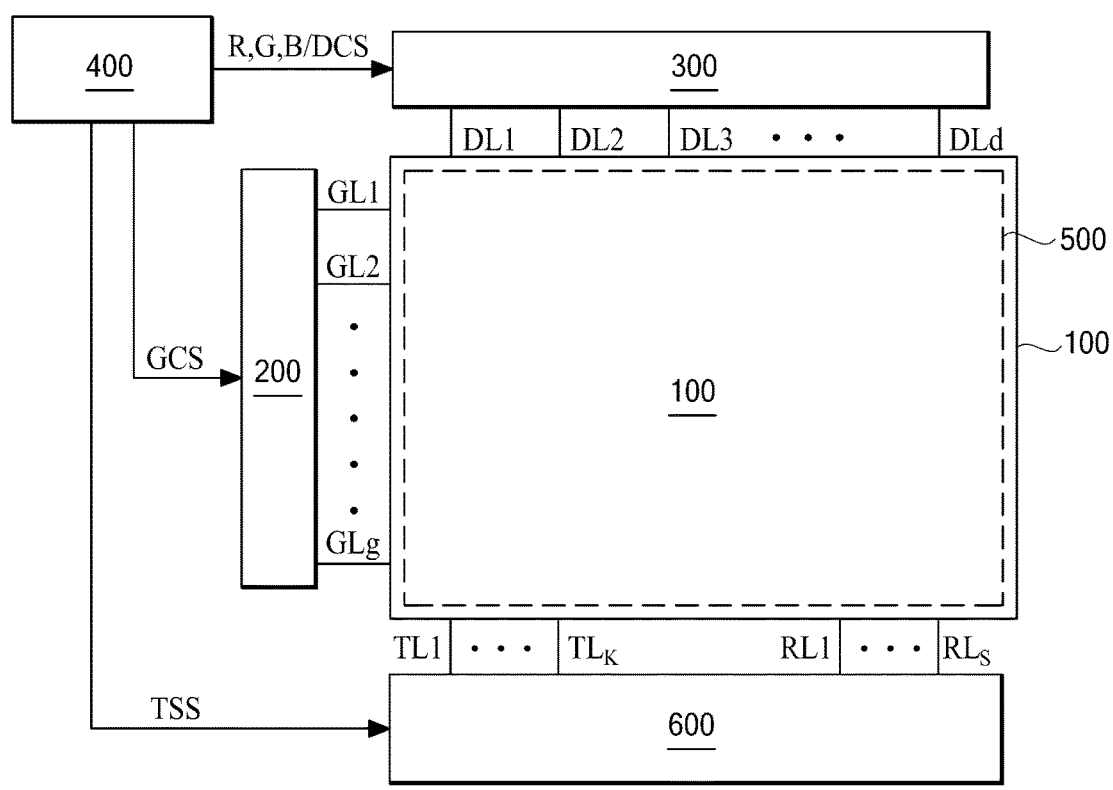
FIG. 3 is an exemplary diagram schematically illustrating a configuration of a display device according to an embodiment of the present invention.

FIG. 3 is an exemplary diagram schematically illustrating a configuration of a display device according to an embodiment of the present invention.

A display device according to the present invention, as shown in FIG. 3, includes a panel 100 displaying an image, a touch panel (or touch array) 500 comprising a plurality of driving electrodes and receiving electrodes, panel drivers 200, 300 & 400 sequentially supplying a scan pulse to gate lines (GL1 to GLg) provided in the panel 100 and supplying data voltages to data lines (DL1 to DLd) provided in the panel 100, and a touch sensing unit 600 supplying a touch driving signal to the driving electrodes and configured to determine whether there is a touch in the panel by using sensing signals received from the receiving electrodes.

First, the panel 100 may be adhered to the touch panel 500 through an adhering unit, such as Ultra Violet (UV) Resin, Optically Clear Resin (OCR), Optically Clear Adhesive (OCA) or the like, and may be built into the panel 100.

When the panel is a liquid crystal panel, a plurality of data lines (DL1 to DLd), gate lines (GL1 to GLg) intersecting the data lines, a plurality of thin film transistors (TFTs) which are respectively provided in a plurality of pixels provided in intersection areas between the data lines and the gate lines, a plurality of pixel electrodes respectively provided in each of the pixels and configured to store a data voltage into a corresponding pixel, and common electrode for driving liquid crystal with the pixel electrode are provided in a lower substrate (TFT substrate) of the panel 100.

That is, the plurality of pixels are arranged in a matrix type due to an intersection structure between the data lines (DL1 to DLd) and the gate lines (GL1 to GLg), and the TFT, the pixel electrode and the common electrode are provided in each of the pixels. When the touch panel is built into the panel 100, the touch panel is configured with the common electrodes.

A black matrix (BM) and a color filter (CF) are provided on an upper substrate (CF substrate) of the panel 100.

A polarizer is adhered to each of the upper substrate and the lower substrate of the panel 100. An alignment layer for setting a pre-tilting angle of the liquid crystal is formed at an inner surface, contacting the liquid crystal, of both surfaces of each of the upper substrate and the lower substrate. A column space (CS) for maintaining a cell gap may be formed between the upper substrate and lower substrate of the panel 100.

However, as described above, the panel 100 may be manufactured in various types and various shapes in addition to the liquid crystal panel.

Second, as illustrated in FIG. 3, the panel drivers 200, 300 & 400 includes a data driver 300 which supplies a data voltage to the date data lines (DL1 to DLd) provided in the panel 100, a gate driver 200 which sequentially supplies the scan pulse to the gate lines (GL1 to GLg) provided in the panel 100 when the data voltages are being outputted, and a timing controller 400 which controls the data driver 300 and the gate driver 200.

First, the timing controller 400 receives a timing signal, including a data enable signal (DE), a dot clock (CLK), etc., from an external system to generate control signals gate control signals (GCS) and data control signals (DCS) for controlling operation timings of the data driver 300 and the gate driver 200.

Moreover, the timing controller 400 rearranges input video data transferred from the external system to supply the rearranged video data to the data driver 300.

GCS generated by the timing controller 400 includes a gate start pulse (GSP), a gate shift clock (GSC), a gate output enable signal (GOE), etc.

DCS generated by the timing controller 400 includes a source start pulse (SSP), a source shift clock signal (SSC), a source output enable signal (SOE), a polarity control signal (POL), etc.

The timing controller 400 may generate a touch control signal for controlling an operation timing of the touch sensing unit 600 to control the touch sensing unit 600.

That is, the timing controller 400 may generate a touch sync signal (TSS) which allows a plurality of image display periods and a plurality of touch sensing periods to be repeated during one frame period, and transmit TSS to the touch sensing unit 600.

The data driver 300 converts the video data received from the timing controller 400, into the data voltages, and respectively supplies the data voltages for one horizontal line to the data lines at every one horizontal period where a scan pulse is supplied to one gate line. That is, the data driver 300 converts the video data into the data voltages by using gamma voltages supplied from a gamma voltage generator (not shown), and respectively outputs the data voltages to the data lines.

The data driver 300 shifts a source start pulse supplied from the timing controller 400 according to a source shift clock to generate a sampling signal. Furthermore, the data driver 300 latches the video data RGB, which are inputted according to the source shift clock, according to the sampling signal to convert the video data into the data voltages, and then, supplies the data voltages to the data lines a horizontal line by a horizontal line in response to a source output enable signal.

To this end, the data driver 300 may include a shift register, a latch unit, a digital-to-analog converter, and an output buffer, or the like.

The shift register generates a sampling signal by using data control signals received from the timing controller 400.

The latch latches the digital video data (RGB) sequentially received from the timing controller 400, and simultaneously outputs the latched video data to the DAC.

The DAC simultaneously converts the video data, transferred from the latch, into positive or negative data voltages, and outputs the positive or negative data voltages. Specifically, the DAC converts the image data into the positive or negative data voltages by using a gamma voltage supplied from a gamma voltage generator (not shown) according to a polarity control signal (POL) transferred from the timing controller 400, and outputs the positive or negative data voltages to the respective data lines.

The output buffer outputs the positive or negative data voltages, transferred from the DAC, to the respective data lines (DL) of the panel 100 according to a source output enable signal transferred from the timing controller 400.

Finally, the gate driver 200 shifts a gate start pulse transferred from the timing controller 400 to sequentially supply a scan pulse having a gate-on voltage (Von) to the gate lines (GL1 to GLg) according to a gate shift clock. Furthermore, the gate driver 200 supplies a gate-off voltage (Voff) to the gate lines (GL1 to GLg) during a period where the scan pulse having the gate-on voltage (Von) is not supplied to the gate lines (GL1 to GLg).

Hereinabove, the data driver 300, the gate driver 200 and the timing controller 400 have been described as begin separately provided. However, at least one of the data driver 300 and the gate driver 200 may be integrated into the timing controller.

Third, the touch panel applied to the present invention uses a capacitive type, and is built into the panel 100. The touch panel may be provided in an in-cell type, an add-on type, a hybrid in-cell type, or the like, in the panel 100.

The in-cell type touch panel includes driving electrodes and receiving electrodes which are provided in the panel 100. That is, in the in-cell type touch panel, all of the driving electrodes and the receiving electrodes are provided in the panel 100.

The add-on type touch panel is manufactured independently from the panel 100 that displays an image, and is adhered to the panel 100.

In the hybrid in-cell type touch panel, one of the driving electrode and the receiving electrode is provided on the lower substrate, the other electrode is provided on the upper substrate. For example, when the driving electrodes are provided on the lower substrate, the receiving electrodes may be provided in the upper substrate.

As described above, the touch panel applied to the present invention may be provided in various types such as an in-cell type, an add-on type, a hybrid in-cell type, etc.

Moreover, the driving electrodes and the receiving electrodes of the touch panel 500 may be formed in a metal-mesh structure. In this case, the touch panel 500 has a lower resistance, and thus, a size of the touch panel may be enlarged. In particular, because a bending characteristic of the metal-mesh structure is better than that of a transparent electrode such as indium tin oxide (ITO), a flexible touch panel having the metal-mesh structure may be implemented. Moreover, a touch panel 500 may be configured in a mutual type or a self-capacitance type, but the touch panel 500 applied to the present invention is configured in a mutual type.

Therefore, hereinafter, for convenience of a description, an in-cell type touch panel 500 having a mutual type will be described as an example of the present invention.

The in-cell type touch panel 500 includes driving electrodes and receiving electrodes, and the driving electrodes and the receiving electrodes configure the common electrodes. For example, some of the common electrodes used to display an image are used as the driving electrodes, and the other electrodes are used as the receiving electrodes.

In this case, each of the driving electrodes configuring the touch panel is configured with sub driving electrodes which are connected to each other through a driving electrode line.

Moreover, each of the receiving electrodes configuring the touch panel is configured with sub receiving electrodes which are connected to each other through a receiving electrode line.

Moreover, at least two sub receiving electrodes respectively configuring receiving electrodes insulated from each other are disposed between two sub driving electrodes configuring one driving electrode.

Hereinafter, the touch panel 500 will be described in detail with reference to the drawings.

Fourth, by using the sensing signals transferred from the receiving electrodes, the touch sensing unit 600 determines whether there is a touch and analyzes a touched position. For example, when a touch driving signal for detecting a touch is sequentially supplied to the driving electrodes, by user's touching a specific area of the touch panel 500 with a finger or a pen, the capacitances between the driving electrodes and the receiving electrodes are changed, and the capacitance changes effects the changes in level of a sensing signal which is transferred to the touch sensing unit 600 through the receiving electrode.

The receiving electrodes are connected to the touch sensing unit 600 through receiving electrode lines (RL1 to RLs), the driving electrodes are connected to the touch sensing unit 600 through driving electrode lines (TL1 to TLk), and as described above, by using sensing signals transferred from the receiving electrodes, the touch sensing unit 600 determines whether there is a touch in the panel 100 and analyzes a touched position in the panel 100.

In particular, the touch sensing unit 600 sequentially supplies a touch driving signal to the driving electrodes disposed in a first direction of the panel 100. Moreover, when a touch driving signal is supplied to an $n^{th}$ driving electrode among the driving electrodes, the touch sensing unit 600 receives sensing signals from at least two receiving electrodes disposed between sub driving electrodes configuring the $n^{th}$ driving electrode. Then, the touch sensing unit analyzes the sensing signals to determine whether there is a touch in at least two positions in a second direction vertical to the first direction between the sub driving electrodes configuring the $n^{th}$ driving electrode.

To this end, the touch sensing unit 600 includes a touch driving unit sequentially supplying a touch driving signal to the driving electrodes during the touch sensing period, and a touch receiving unit determining whether there is a touch on the touch panel 500 and analyzing a touched position, by using sensing signals transferred from the receiving electrodes during the touch sensing period.

Hereinafter, a configuration and function of the touch sensing unit 600 will be described in detail with reference to FIG. 4.

Figure 4:
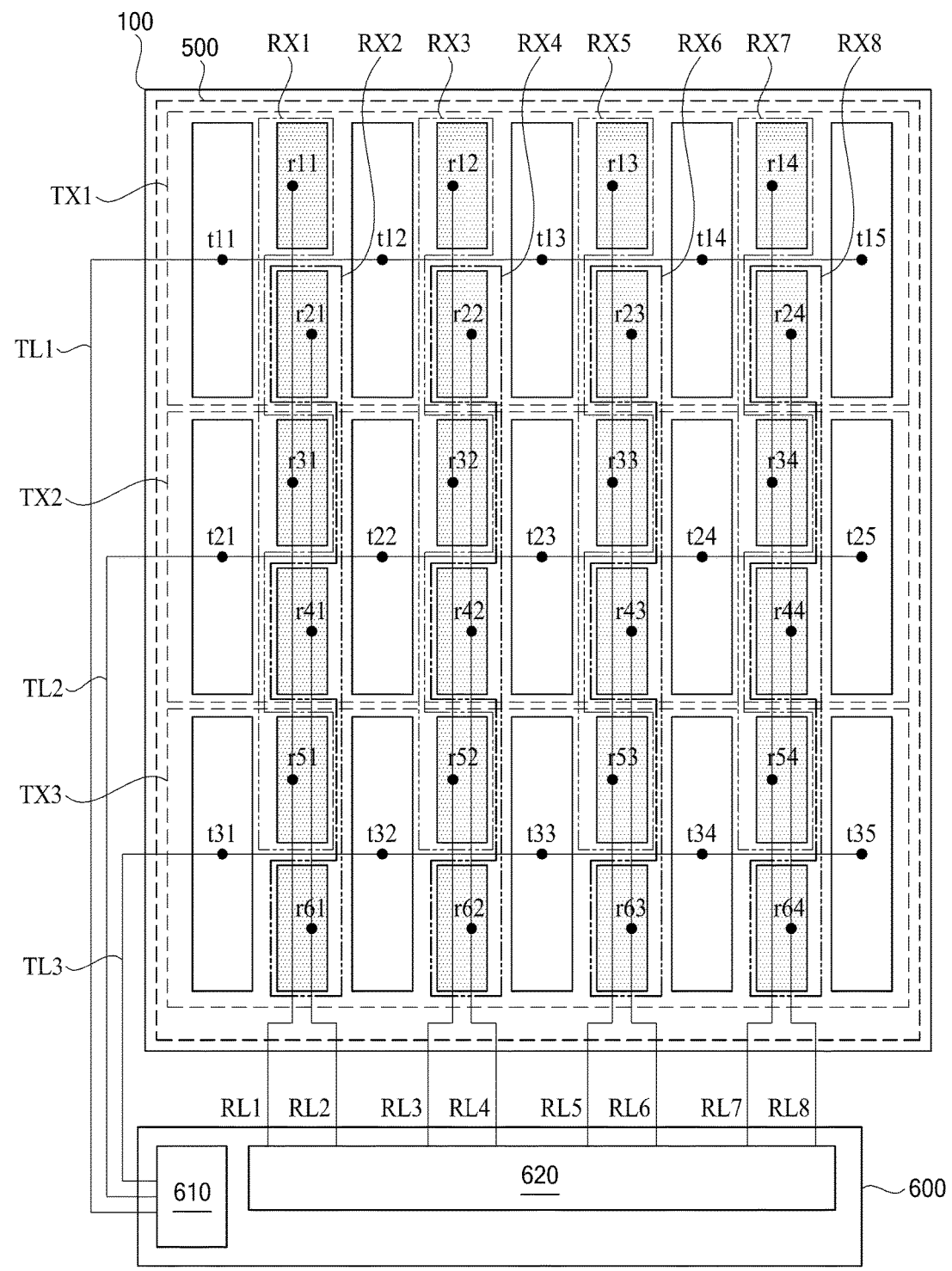
FIG. 4 is an exemplary diagram schematically illustrating a configuration of a touch panel applied to a display device according to a first embodiment of the present invention.

FIG. 4 is an exemplary diagram schematically illustrating a configuration of a touch panel applied to a display device according to a first embodiment of the present invention. Hereinafter, a touch panel 500 and a touch sensing unit 600 applied to a display device according to the first embodiment of the present invention will be described with reference to FIGS. 3 and 4.

The touch panel 500 includes a plurality of driving electrodes (TX) disposed in a first direction of the panel 100, and a plurality of receiving electrodes (RX) disposed in a second direction vertical to the first direction. The number of the driving electrodes (TX) and the number of the receiving electrodes (RX) may be variously changed depending on a size and a shape of the touch panel 500. Hereinafter, as shown in FIG. 4, a touch panel 500 configured with three driving electrodes (TX1 to TX3) and eight receiving electrodes (RX1 to RX8) will be described as an example of the present invention.

Moreover, at least two sub receiving electrodes respectively configuring receiving electrodes electrically insulated from each other may be disposed between two sub driving electrodes configuring one driving electrode. Hereinafter, as shown in FIG. 4, a touch panel 500, in which two sub receiving electrodes are disposed between two sub driving electrodes, will be described as an example of the present invention.

First, each of the driving electrodes (TX1 to TX3) disposed in a first direction of the panel 100 is configured with sub driving electrodes connected to each other through one driving electrode line (TL).

For example, a first driving electrode (TX1) is configured with five sub driving electrodes (t11 to t15) which are connected to each other through a first driving electrode line (TL1), a second driving electrodes (TX2) is configured with five sub driving electrodes (t21 to t25) which are connected to each other through a second driving electrode line (TL2), and a third driving electrode (TX3) is configured with five sub driving electrodes (t31 to t35) which are connected to each other through a third driving electrode line (TL3).

The first driving electrode line (TL1), the second driving electrode line (TL2) and the third electrode line (TL3) are connected to the touch sensing unit 600, and particularly, are connected to the touch driving unit 610 configuring the touch sensing unit 600.

Second, each of the receiving electrodes (RX1 to RX8) disposed in a second direction vertical to the first direction is configured with sub receiving electrodes which are connected to each other through one receiving electrode line (RL).

For example, the first receiving electrode (RX1) is configured with three sub receiving electrodes (r11, r31 and r51) which are connected to each other through a first receiving electrode line (RL1), a second receiving electrodes (RX2) is configured with three sub receiving electrodes (r21, r41 and r61) which are connected to each other through a second receiving electrode line (RL2), the seventh receiving electrode (RX7) is configured with three sub receiving electrodes (r14, r34 and r54) which are connected to each other through a seventh receiving electrode line (RL7), and a eighth receiving electrode (RX8) is configured with three sub receiving electrodes (r24, r44 and r64) which are connected to each other through an eighth receiving electrode line (RL8).

Third, two sub receiving electrodes respectively configuring receiving electrodes (RX) electrically insulated from each other are disposed between two sub driving electrodes configuring one driving electrode (TX).

For example, a $1-1^{st}$ sub receiving electrode (r11), which is one of sub receiving electrodes configuring the first receiving electrode (RX1), and a $2-1^{st}$ sub receiving electrode (r21), which is one of sub receiving electrodes configuring the second receiving electrode (RX2), are disposed between a first sub driving electrode (t11) and a second sub driving electrode (t12) among sub driving electrodes (t11, t12, t13, t14 and t15) configuring the first driving electrode (TX1).

Fourth, two sub receiving electrodes disposed between two sub driving electrodes are arranged in one row along the second direction.

For example, a $1-1^{st}$ sub receiving electrode (r11), which is one of sub receiving electrodes configuring the first receiving electrode (RX1), and a $2-1^{st}$ sub receiving electrode (r21), which is one of sub receiving electrodes configuring the second receiving electrode (RX2), are disposed between the first sub driving electrode (t11) and the second sub driving electrode (t12) among the sub driving electrodes configuring the first driving electrode (TX1). The $1-1^{st}$ receiving electrode (r11) and the $2-1^{st}$ sub receiving electrode (r21) are arranged in one row along the second direction. For example, sub receiving electrodes respectively configuring at least two receiving electrodes are alternately arranged along the second direction and receiving electrode lines disposed between adjacent sub driving electrodes are disposed to overlap the sub receiving electrodes alternately arranged along the second direction.

Moreover, mutual capacitance being generated by two receiving electrodes with respect to one driving electrode.

Also, a $1-2^{nd}$ sub receiving electrode (r31), which is one of sub receiving electrodes configuring the first receiving electrode (RX1), and a $2-2^{nd}$ sub receiving electrode (r41), which is one of sub receiving electrodes configuring the second receiving electrode (RX2), are disposed between a first sub driving electrode (t21) and a second sub driving electrode (t22) among sub driving electrodes (t21, t22, t23, t24 & t25) configuring the second driving electrode (TX2). The $2-2^{nd}$ receiving electrode (r31) and the $2-2^{nd}$ sub receiving electrode (r41) are arranged in one row along the second direction.

In this case, the $1-1^{st}$ sub receiving electrode (r11), the $1-2^{nd}$ sub receiving electrode (r31), and a $1-3^{rd}$ sub receiving electrode (r51) are connected to each other through a first receiving electrode line (RL1) to configure the first receiving electrode (RX1). Moreover, the $2-1^{st}$ sub receiving electrode (r21), the $2-2^{nd}$ sub receiving electrode (r41), and a $2-3^{rd}$ sub receiving electrode (r61) are connected to each other through a second receiving electrode line (RL2) to configure the second receiving electrode (RX2). For example, sub receiving electrodes, which configure one receiving electrode, among the receiving electrodes arranged in one row along the second direction are connected to each other through one receiving electrode line.

The first receiving electrode line (RL1), the second receiving electrode line (RL2) and other receiving electrode lines (RL3 to RL8) are connected to the touch sensing unit 600, and particularly, are connected to a touch receiving unit 620 configuring the touch sensing unit 600.

Fifth, when the touch driving signal is supplied to an $n^{th}$ driving electrode among the driving electrodes, the touch sensing unit 600 calculates a first coordinate value corresponding to the first direction by using position information, in the first direction, of a receiving electrode, in which it is determined that there is a touch. The touch sensing unit 600 calculates a second coordinate value corresponding to the second direction by using position information of the $n^{th}$ driving electrode in the second direction, and position information of an $m^{th}$ sub receiving electrode, which is disposed between sub driving electrodes configuring the $n^{th}$ driving electrode, among the sub receiving electrodes configuring the receiving electrode, through which a sensing signal corresponding to a touch is received. The touch sensing unit 600 is configured to determine a position, in which a touch occurs, by using the first and second coordinate values.

For example, each of the receiving electrodes shown in FIG. 4 denotes one coordinates (X, Y) configured with a first coordinate value (a coordinate value of an X axis direction, for example, an abscissa axis direction in FIG. 4) and a second coordinate value (a coordinate value of a Y axis direction, for example, an ordinate axis direction in FIG. 4). That is, coordinates of (r11) are (1, 1), coordinates of (r21)

are (1, 2), coordinates of (r61) is (1, 6), coordinates of (r14) is (4, 1), coordinates of (r24) are (4, 2), and coordinates of (r64) are (4, 6). Numbers respectively indicating sub driving electrodes (r11 to r64) shown in FIG. 4 are illustrated in the order of a Y axis direction and an X axis direction. Therefore, a fore numeral of each of the numbers indicating the sub receiving electrodes corresponds to the Y coordinate value of the coordinates (X, Y), and a latter numeral of each of the numbers indicating the sub receiving electrodes corresponds to the X coordinate value of the coordinates (X, Y). For example, coordinates (X, Y) of the sub receiving electrode illustrated as (r64) is (4, 6), but the sub receiving electrode is illustrated as r64.

In this case, twenty-four coordinates may be set. Hereinafter, a case in which the touch sensing unit 600 calculates coordinates (1, 1) corresponding to r11 of the sub receiving electrodes will be described as an example of the present invention.

For example, when the touch driving signal is supplied to the first driving electrode (TX1) and a sensing signal corresponding to a touch is received from the first receiving electrode (RX1), the touch sensing unit 600 calculates a first coordinate value by using position information, indicating that the first receiving electrode (RX1) is disposed at a first position from a left offend in the first direction. That is, the first coordinate value is '1'.

Moreover, the touch sensing unit 600 calculates a second coordinate value by using position information of the first driving electrode (TX1) in the second direction, and position information of the 1-1$^{st}$ sub receiving electrode (r11), which is disposed between sub driving electrodes (t11 and t12) configuring the first driving electrode (TX1), among sub receiving electrodes configuring the first receiving electrode (RX1) through which the sensing signal corresponding to a touch is received.

To provide an additional description, because the sensing signal is received when the touch driving signal is supplied to the first driving electrode (TX1), the touch sensing unit 600 may know that the first driving electrode (TX1) is disposed on a first line in the second direction in the touch panel 500. Moreover, the touch sensing unit 600 may know that the 1-1$^{st}$ sub receiving electrode (r11) is disposed at an upper position than the position of the 2-1$^{st}$ sub receiving electrode (r21), with respect to the second direction. Therefore, the touch sensing unit 600 may know that the position, in which a touch occurs, is a first line in the second direction, and particularly, is an upper position in the first line. Therefore, the second coordinate value is '1'.

The touch sensing unit 600 may determine a position, in which a touch occurs, by using the first coordinate value and the second coordinate value. In the above-described example, the touch sensing unit 600 may know that a touch occurs in a first position with respect to the first direction and a first position with respect to the second direction. Therefore, the touch sensing unit 600 may know that a touch occurs in coordinates (1, 1) among a total of twenty-four positions disposed in the touch panel 500.

To perform the above-described function, as described above, the touch sensing unit 600 may include the touch driving unit 610 and the touch receiving unit 620.

The touch driving unit 610 sequentially supplies the touch driving signals to the driving electrodes, and the touch receiving unit 620 receives the sensing signals.

In this case, the above-described process of determining the touch position may be performed by the receiving unit 620, or may be performed by another element configuring the touch sensing unit 600.

Figure 5:
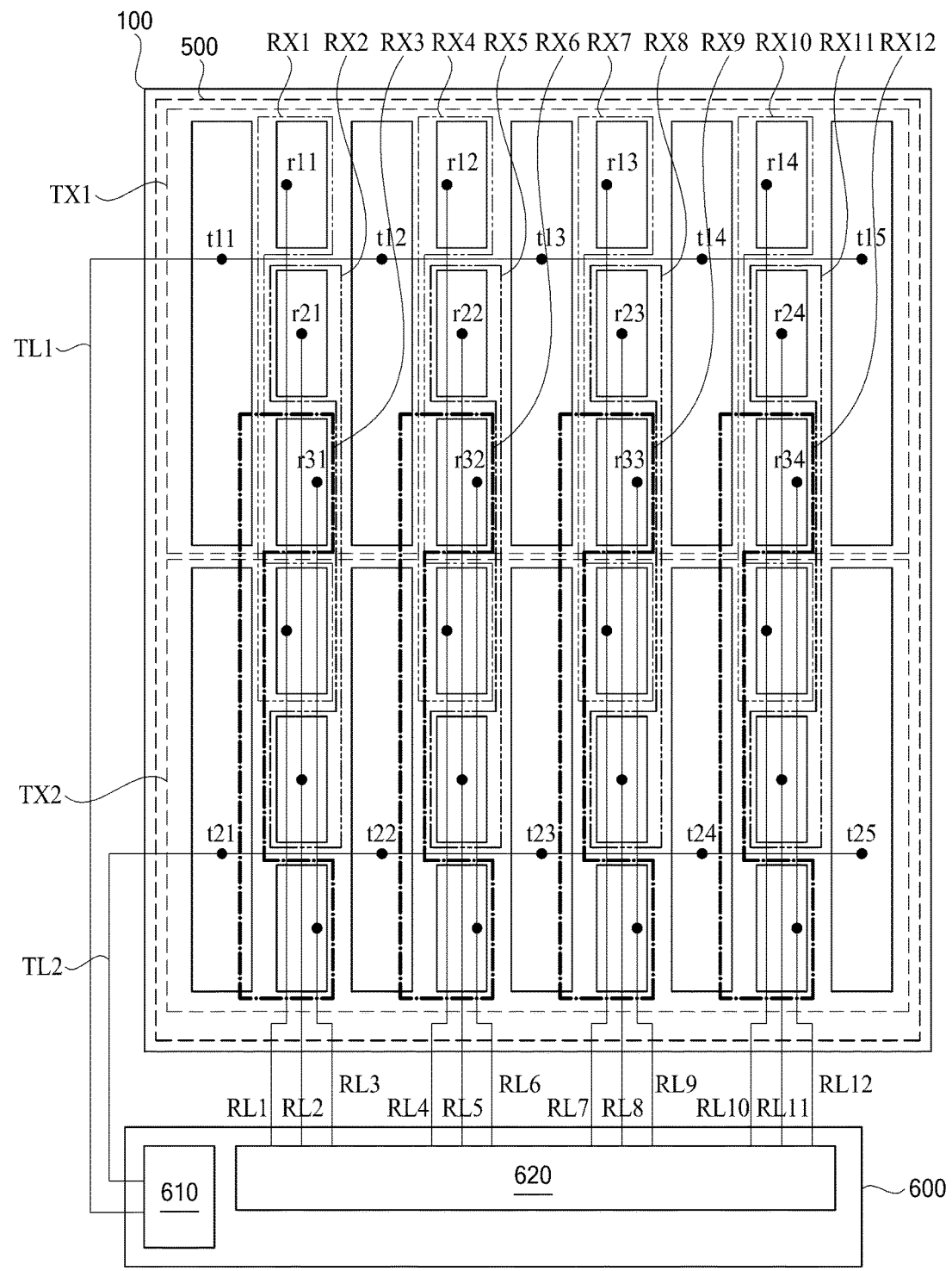
FIG. 5 is an exemplary diagram schematically illustrating a configuration of a touch panel applied to a display device according to a second embodiment of the present invention.

FIG. 5 is an exemplary diagram schematically illustrating a configuration of a touch panel applied to a display device according to a second embodiment of the present invention.

The touch panel 500 includes a plurality of driving electrodes (TX) disposed in a first direction of the touch panel 100, and a plurality of receiving electrodes (RX) disposed in a second direction vertical to the first direction. The number of the driving electrodes (TX) and the number of the receiving electrodes (RX) may be variously changed depending on a size and a type of the touch panel 500.

The touch panel 500 applied to the first embodiment, as shown in FIG. 4, is configured with three driving electrodes (TX1 to TX3), and eight receiving electrodes (RX1 to RX8). However, the touch panel 500 applied to the second embodiment is configured with two driving electrodes (TX1 and TX2), and twelve receiving electrodes (RX1 to RX12).

Moreover, in the touch panel 500 applied to the first embodiment, as shown in FIG. 4, two sub receiving electrodes respectively configuring receiving electrodes electrically insulated from each other are disposed between two sub driving electrodes configuring one driving electrode. However, in the touch panel 500 applied to the second embodiment, as shown in FIG. 5, three sub receiving electrodes respectively configuring receiving electrodes electrically insulated from each other are disposed between two sub driving electrodes configuring one driving electrode.

For example, when comparing the first embodiment to the second embodiment, except that the number of the sub receiving electrodes disposed between the two sub driving electrodes configuring one driving electrode in the touch panel 500 applied to the second embodiment has one more sub receiving electrodes disposed between the two sub driving electrodes configuring one driving electrode in the touch panel, and the number of the driving electrodes in the second embodiment is one less than the number of the driving electrodes in the first embodiment, the touch panel according to the second embodiment of the present invention has the same configuration.

Since the number of driving electrodes disposed in the touch panel 500 decreases, and the number of sub receiving electrodes disposed between two sub driving electrodes increases, a driving speed of the touch panel increase.

Figure 1:
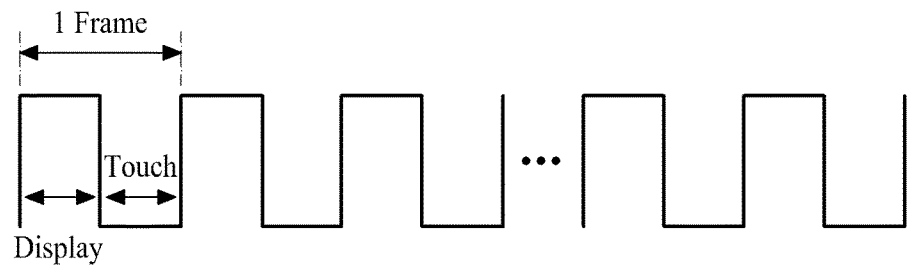
FIG. 1 is an exemplary waveform diagram showing an image display period and a touch sensing period in a related art in-cell type display device.
Figure 2:
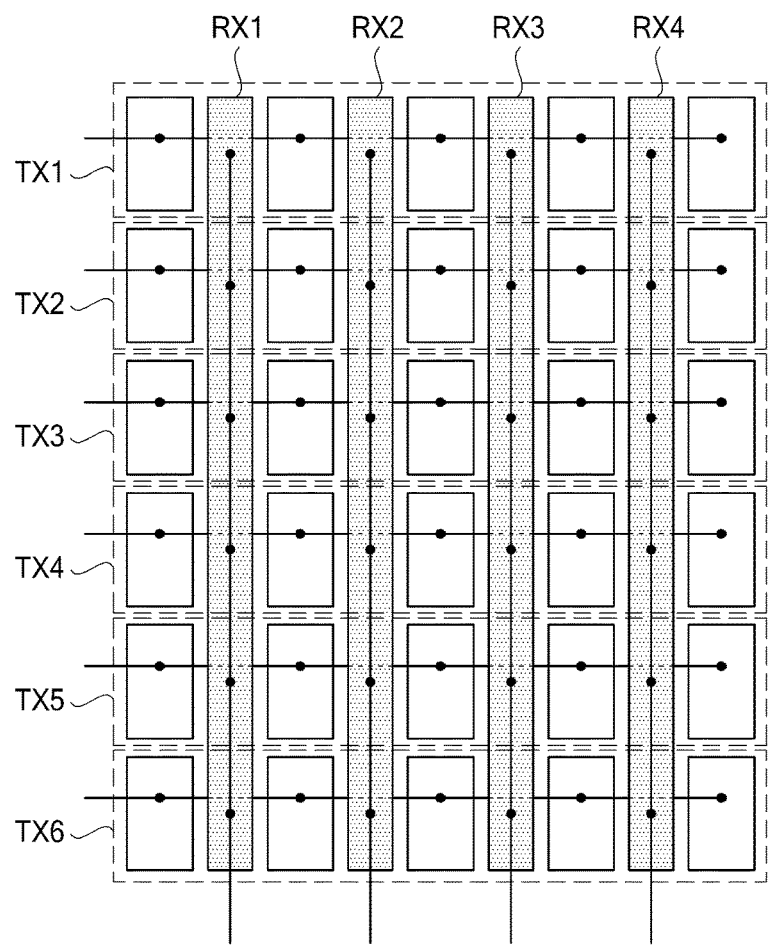
FIG. 2 is an exemplary diagram illustrating a configuration of a related art touch panel using a capacitance type.

For example, in order to determine whether there is a touch in twenty-four coordinates by using a related art touch panel shown in FIG. 2, a total of six touch driving signals should be sequentially supplied to six driving electrodes (TX1 to TX6).

However, in order to determine whether there is a touch in twenty-four coordinates by using a touch panel applied to the first embodiment of the present invention shown in FIG. 4, a total of three touch driving signals are sequentially supplied to three driving electrodes (TX1 to TX3). For example, in the first embodiment of the present invention, whether there is a touch in a plurality of coordinates equal to the number of coordinates disposed in the related art touch panel, may be determined by using touch driving signal which is smaller by three than the number of touch driving signals of a related art. Therefore, a driving time for driving the touch panel 500 may decrease more than that of a related art.

Moreover, in order to determine whether there is a touch in twenty-four coordinates by using a touch panel applied to the second embodiment of the present invention shown in FIG. 5, a total of two touch driving signals are sequentially supplied to two driving electrodes (TX1 and TX2). For example, in the second embodiment of the present invention, whether there is a touch in a plurality of coordinates equal to the number of coordinates disposed in the related art touch panel maybe determined by using touch driving signals which are four less than the number of touch driving signals of the related art. Therefore, a driving time for driving the touch panel 500 more decrease than that of the related art.

To provide an additional description, in the first and second embodiments, when a touch driving signal is supplied to one driving electrode, whether there is a touch in two different positions or three different positions, which are disposed along the second direction, may be simultaneously determined Therefore, whether the touch panel 500 is wholly touched may be determined by using touch driving signals which are less than the number of touch driving signals of the related art. Therefore, in the display device according to the present invention, a time taken in supplying the touch driving signals to the touch panel 500 is reduced.

However, since a time taken in supplying one driving signal to one driving electrode does not decrease, a touch sensitivity of each of the driving electrodes does not decrease.

On the other hand, accumulated time taken in supplying the touch driving signals to all of the driving electrodes is shortened. Therefore, a time taken in supplying the touch driving signal to each of the driving electrode increases by a time corresponding to the shortened time, and thus, a touch sensitivity can be enhanced. In other words, the accumulated time for driving every driving electrode of the touch panel 500 can be reduced by the first and the second embodiments of the present invention. On the other hand, to improve the touch sensitivity of the first and the second embodiments, the accumulated time can be increased. To do this, each driving time for each driving electrodes can be increased. Consequently, each driving electrodes can supply touch driving signals for longer time. If the accumulated time for the first embodiment and the second embodiment are the same as the related art touch panel shown in FIG. 2, superior touch sensitivity can be achieved.

Figure 6:
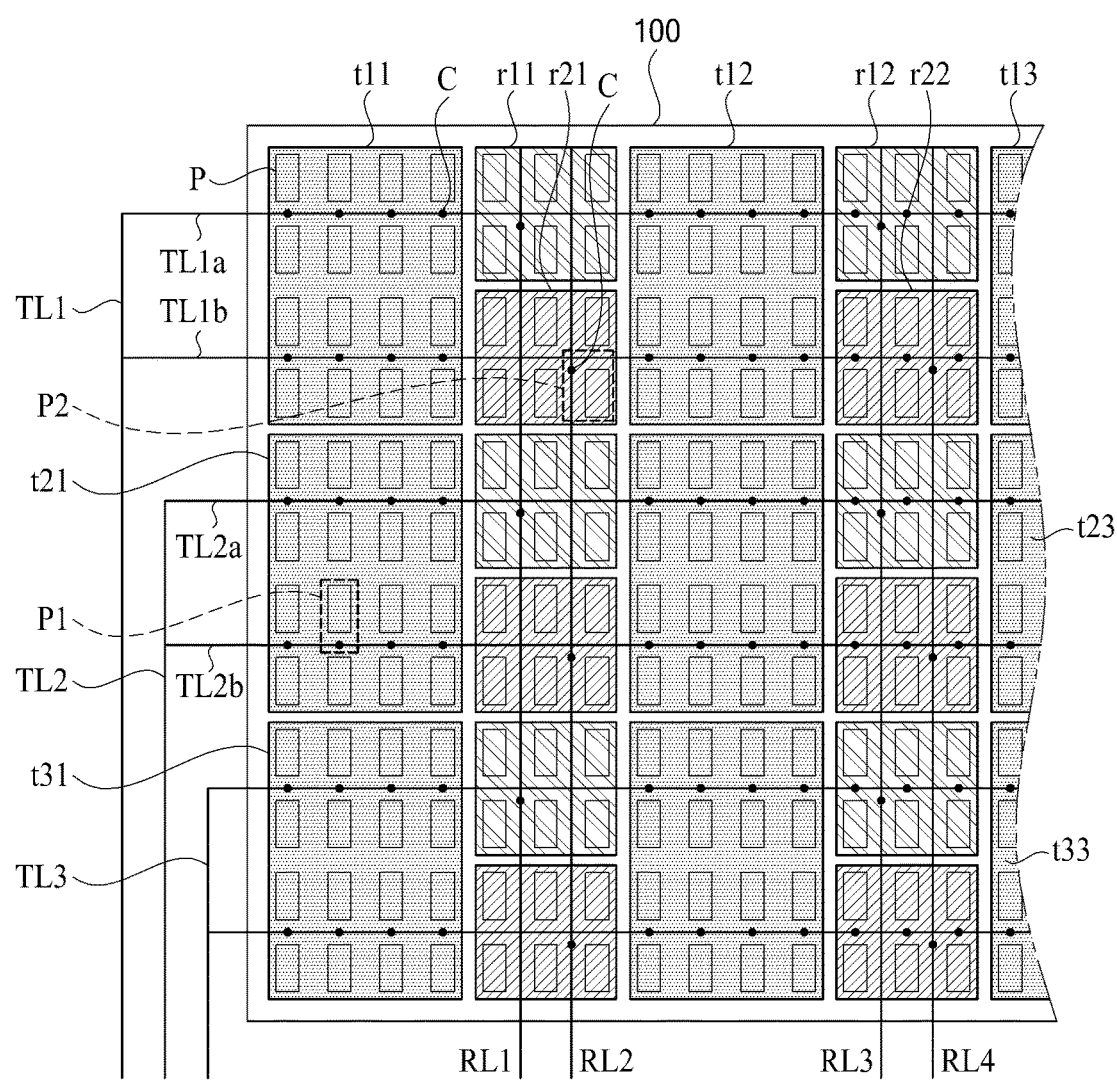
FIG. 6 is a plan view of a panel applied to a display device according to the present invention.

FIG. 6 is a plan view of a panel applied to a display device according to the present invention, and particularly, is a plan view of a touch panel applied to the first embodiment of the present invention.

As described above, the touch panel 500 applied to the present invention is manufactured separately from the panel 100, and then, may be attached to the panel 100. Also, as described above with reference to the first and second embodiments, the touch panel 500 may be built into the panel 100.

A plan view of an embodiment of the panel 100, into which the touch panel 500 is built, is illustrated in FIG. 6. In particular, a portion of the panel 100 applied to the first embodiment of the present invention is illustrated in FIG. 6.

The touch panel 500 applied to the first embodiment of the present invention is configured with three driving electrodes (TX1 to TX3) and eight receiving electrodes (RX1 to RX8), and two sub receiving electrodes are disposed between two sub driving electrodes. In FIG. 6, a portion of the panel 100 shown in FIG. 4 is illustrated.

In the panel 100, a pixel (P) is disposed in each of areas defined by intersections between the data lines and the gate lines.

Each of the sub driving electrodes (t11 to t35) and the sub receiving electrodes (r11 to r64) are disposed in an area corresponding to one or more pixels.

For example, as shown in FIG. 6, the sub driving electrode is disposed in an area corresponding to sixteen pixels, and the sub receiving electrode is disposed in an area corresponding to six pixels.

Five sub driving electrodes configuring one driving electrode, as shown in FIG. 4, may be connected to each other through one driving electrode line (TL1, TL2 or TL3), but may be connected to each other through two dependent driving electrode lines branched from one driving electrode line as shown in FIG. 6.

For example, in FIG. 6, a first driving electrode line (TL1) configured with one line is dispose in non-display area of the panel 100, and two dependent driving electrode lines (TL1a and TL1b) branched from the first driving electrode line (TL1) are disposed in an active area of the panel 100. Five sub driving electrodes (t11, t12, t13, t14 and t15) configuring the first driving electrode (TX1) are electrically connected to each other through the two dependent driving electrode lines (TL1a and TL1b).

Therefore, in the first sub driving electrode (t11), one or more contact holes (C) connected to a first dependent driving electrode line (TL1a) and one or more contact holes (C) connected to a second dependent driving electrode line (TL1b) are provided. In the panel shown in FIG. 6, the first sub driving electrode (t11) is connected to the first dependent driving electrode line (TL1a) through four contact holes (C), and connected to the second dependent driving electrode line (TL1b) through another four contact holes (C). An area shown as a point in FIG. 6 denotes a contact hole (C).

The driving electrode line or the dependent driving electrode line is disposed along the first direction in the active area.

When the gate line is disposed along the first direction, the driving electrode line or the dependent driving electrode line may be disposed in parallel with the gate line. In this case, the driving electrode line or the dependent driving electrode line may be disposed on the same layer as that of the gate line.

Three sub receiving electrodes configuring one receiving electrode, as shown in FIGS. 4 and 6, may be connected to each other through one receiving electrode line, but may be connected to each other through two or more dependent receiving electrode lines branched from one receiving electrode line.

For example, in FIG. 4, a first receiving electrode line (RL1) configured with one line is dispose in non-display area of the panel 100, and three sub receiving electrodes (r11, r31 and r51) configuring the first receiving electrode (RX1) are electrically connected to each other through the receiving electrode line (RL1).

In this case, in the first sub receiving electrode (r11), one or more contact holes (C) connected to the first receiving electrode line (RL1) is provided. In the panel shown in FIG. 6, the first sub receiving electrode (r11) is connected to the first receiving electrode line (RL1) through one contact hole (C). An area shown as a point in FIG. 6 denotes a contact hole (C).

The receiving electrode line is disposed along the second direction.

When the data line is disposed along the second direction, the receiving electrode line may be disposed in parallel with the data line. As another example, the receiving electrode line may be disposed to overlap the data line with an insulation layer therebetween.

Figure 7:
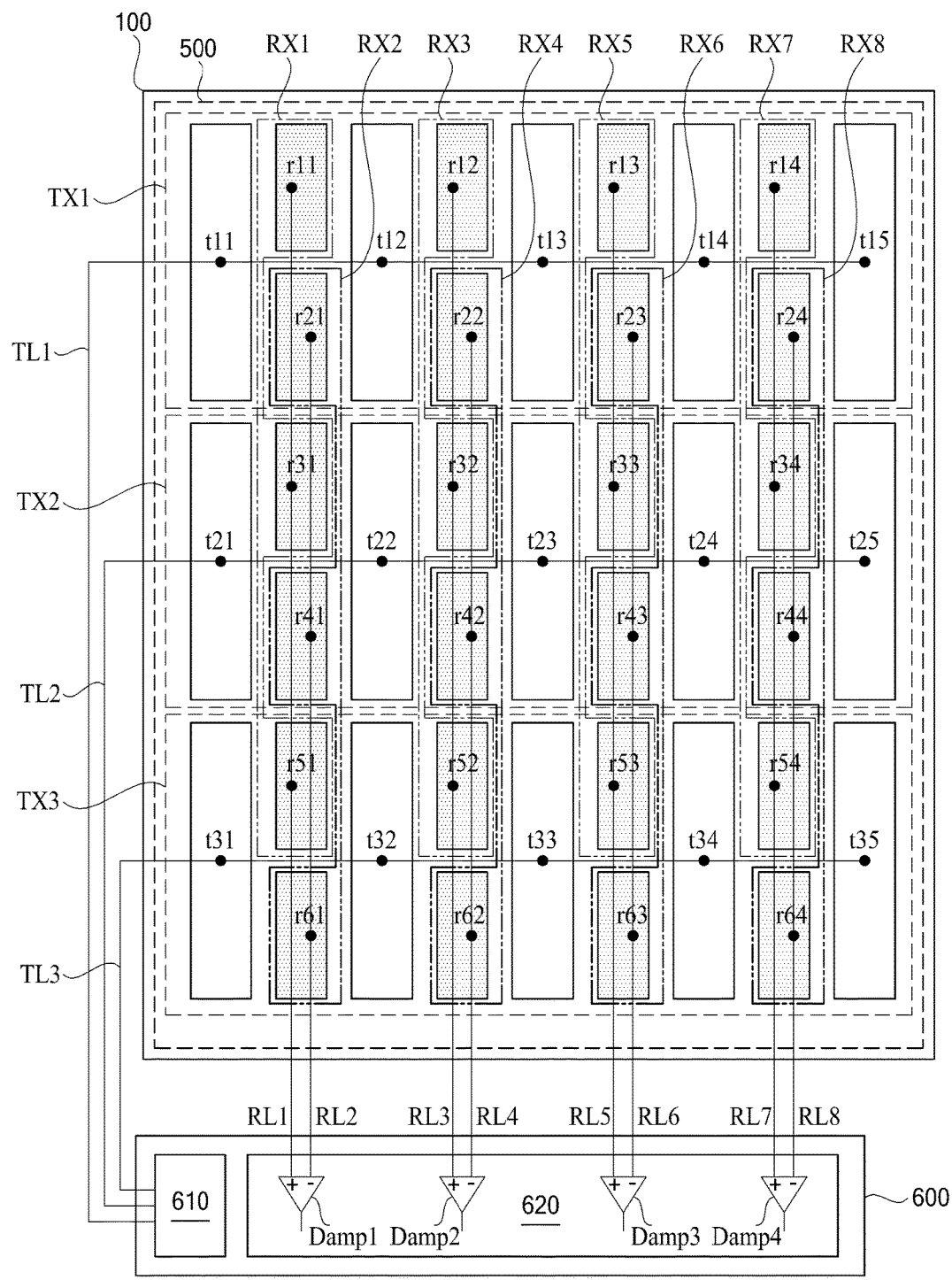
FIG. 7 is an exemplary diagram illustrating a configuration of a touch panel and a touch sensing unit applied to a display device according to a third embodiment of the present invention.

FIG. 7 is an exemplary diagram illustrating a configuration of a touch panel and a touch sensing unit applied to a display device according to a third embodiment of the present invention. The display device according to the third embodiment of the present invention is similar to the display device according to the first embodiment. Therefore, in the following description, details which are the same as or similar to the details described above with reference to FIGS. 3, 4 and 6 are not repeated or will be briefly described. Moreover, the following description will focus on a configuration of the touch panel 500 and the touch sensing unit 600.

A configuration of the touch panel 500 applied to a display device according to the third embodiment of the present invention will be described in detail.

The touch panel 500 includes a plurality of driving electrodes disposed in a first direction of the panel 100, and a plurality of receiving electrodes disposed in a second direction perpendicular to the first direction. The number of the driving electrodes and the number of the receiving electrodes may be an even number, and may be variously changed depending on a size and a shape of the touch panel 500. Hereinafter, as shown in FIG. 7, a touch panel 500 configured with three driving electrodes (TX1 to TX3) and eight receiving electrodes (RX1 to RX8) will be described as an example of the present invention.

Moreover, two sub receiving electrodes respectively configuring a pair of receiving electrodes electrically insulated from each other are disposed between two sub driving electrodes configuring one driving electrode. Hereinafter, as shown in FIG. 7, a touch panel 500, in which two sub receiving electrodes are disposed between two sub driving electrodes, will be described as an example of the present invention.

First, each of the driving electrodes (TX1 to TX3) disposed in a first direction of the panel 100 is configured with sub driving electrodes connected to each other through one driving electrode line (TL).

For example, a first driving electrode (TX1) is configured with five sub driving electrodes (t11 to t15) connected to each other through a first driving electrode line (TL1), a second driving electrodes (TX2) is configured with five sub driving electrodes (t21 to t25) connected to each other through a second driving electrode line (TL2), and a third driving electrode (TX3) is configured with five sub driving electrodes (t31 to t35) connected to each other through a third driving electrode line (TL3).

The first driving electrode line (TL1), the second driving electrode line (TL2) and the third electrode line (TL3) are connected to the touch sensing unit 600, and particularly, are connected to the touch driving unit 610 configuring the touch sensing unit 600.

Second, each of the receiving electrodes (RX1 to RX8) disposed in a second direction intersecting the first direction is configured with sub receiving electrodes which are connected to each other through one receiving electrode line (RL).

For example, the first receiving electrode (RX1) is configured with three sub receiving electrodes (r11, r31 and r51) which are connected to each other through a first receiving electrode line (RL1), a second receiving electrodes (RX2) is configured with three sub receiving electrodes (r21, r41 and r61) which are connected to each other through a second receiving electrode line (RL2), the seventh receiving electrode (RX7) is configured with three sub receiving electrodes (r14, r34 and r54) which are connected to each other through a seventh receiving electrode line (RL7), and a eighth receiving electrode (RX8) is configured with three sub receiving electrodes (r24, r44 and r64) which are connected to each other through an eighth receiving electrode line (RL8).

Third, two sub receiving electrodes respectively configuring a pair of receiving electrodes electrically insulated from each other are disposed between two sub driving electrodes configuring one driving electrode (TX).

For example, a 1-$1^{st}$ sub receiving electrode (r11), which is one of sub receiving electrodes configuring the first receiving electrode (RX1), and a 2-$1^{st}$ sub receiving electrode (r21), which is one of sub receiving electrodes configuring the second receiving electrode (RX2) are disposed between a first sub driving electrode (t11) and a second sub driving electrode among sub driving electrodes (t11, t12, t13, t14 and t15) configuring the first driving electrode (TX1).

Fourth, two sub receiving electrodes disposed between two sub driving electrodes are arranged in one row along the second direction.

For example, a 1-$1^{st}$ sub receiving electrode (r11), which is one of sub receiving electrodes configuring the first receiving electrode (RX1), and a 2-$1^{st}$ sub receiving electrode (r21) which is one of sub receiving electrodes configuring the second receiving electrode (RX2) are disposed between the first sub driving electrode (t11) and the second sub driving electrode (t12) among the sub driving electrodes configuring the first driving electrode (TX1). The 1-$1^{st}$ receiving electrode (r11) and the 2-$1^{st}$ sub receiving electrode (r21) are arranged in one row along the second direction.

Also, a 1-$2^{nd}$ sub receiving electrode (r31), which is one of sub receiving electrodes configuring the first receiving electrode (RX1), and a 2-$2^{nd}$ sub receiving electrode (r41), which is one of sub receiving electrodes configuring the second receiving electrode (RX2), are disposed between a first sub driving electrode (t21) and a second sub driving electrode (t22) among sub driving electrodes configuring the second driving electrode (TX2). The 2-$2^{nd}$ receiving electrode (r31) and the 2-$2^{nd}$ sub receiving electrode (r41) are arranged in one row along the second direction.

In this case, the 1-$1^{st}$ sub receiving electrode (r11), the 1-$2^{nd}$ sub receiving electrode (r31), and a 1-$3^{rd}$ sub receiving electrode (r51) are connected to each other through a first receiving electrode line (RL1) to configure the first receiving electrode (RX1). Moreover, the 2-$1^{st}$ sub receiving electrode (r21), the 2-$2^{nd}$ sub receiving electrode (r41), and a 2-$3^{rd}$ sub receiving electrode (r61) are connected to each other through a second receiving electrode line (RL2) to configure the second receiving electrode (RX2). For example, sub receiving electrodes, which configure one receiving electrode, among the receiving electrodes arranged in one row along the second direction are connected to each other through one receiving electrode line.

The first receiving electrode line (RL1), the second receiving electrode line (RL2) and other receiving electrode lines (RL3 to RL8) are connected to the touch sensing unit 600, and particularly, are connected to a touch receiving unit 620 configuring the touch sensing unit 600.

As described above, two sub receiving electrodes configuring a pair of receiving electrodes electrically insulated from each other may be disposed between two sub driving electrodes configuring one driving electrode. Two sub receiving electrodes disposed between two sub driving electrodes may denote two sub receiving electrodes disposed between two adjacent sub driving electrodes.

A configuration of the touch sensing unit 600 applied to the third embodiment of the present invention will be described.

The touch sensing unit 600 determines whether there is a touch and analyzes a touched position, by using a pair of sensing signals transferred from the pair of receiving electrodes. For example, when a touch driving signal for detecting a touch is sequentially supplied to the driving electrodes, by user's touching a specific area of the touch panel 500 with a finger or a pen, capacitances between the driving electrodes and the receiving electrodes are changed, and the capacitance changes effect the changes in level of a sensing signal transferred to the touch sensing unit 600 through the receiving electrode.

The pairs of the receiving electrodes are connected to the touch sensing unit 600 through receiving electrode lines (RL1 to RLs). The driving electrodes are connected to the touch sensing unit 600 through driving electrode lines (TL1 to TLk). The touch sensing unit 600 determines whether there is a touch in the panel 100 and analyzes a touched position in the panel 100, by using a pair of sensing signals transferred from the pair of the receiving electrodes, as described above.

In particular, the touch sensing unit 600 sequentially supplies a touch driving signal to the driving electrodes disposed in a first direction of the panel 100. Moreover, when a touch driving signal is supplied to an $n^{th}$ driving electrode among the driving electrodes, the touch sensing unit 600 receives a pair of sensing signals from a pair of receiving electrodes disposed between sub driving electrodes configuring the $n^{th}$ driving electrode. In this case, the pair of the receiving electrodes is connected to a differential amplifier (Damp), and the differential amplifier (Damp) performs a differential operation on the pair of the sensing signals. The touch sensing unit 600 determines whether there is a touch in at least two positions, which are disposed between the sub driving electrodes and disposed in a second direction intersecting the first direction. In this case, a common noise, which affects on the pair of the receiving electrodes, can be decreased.

To this end, the touch sensing unit 600 includes a touch driving unit sequentially supplying a touch driving signal to the driving electrodes during the touch sensing period, a plurality of differential amplifiers, performing a differential operation on a pair of the sensing signals received through the pair of the receiving electrodes during the touch sensing period, and a touch receiving unit determining whether there is a touch of the touch panel 500 and analyzing a touched position, by using differential sensing signals outputted from the differential amplifiers during the touch sensing period.

A configuration and a function of the touch panel 500 and the touch sensing unit 600 applied to the third embodiment of the present invention will be described in detail with reference to FIGS. 7, 8A and 8B.

Figure 8A:
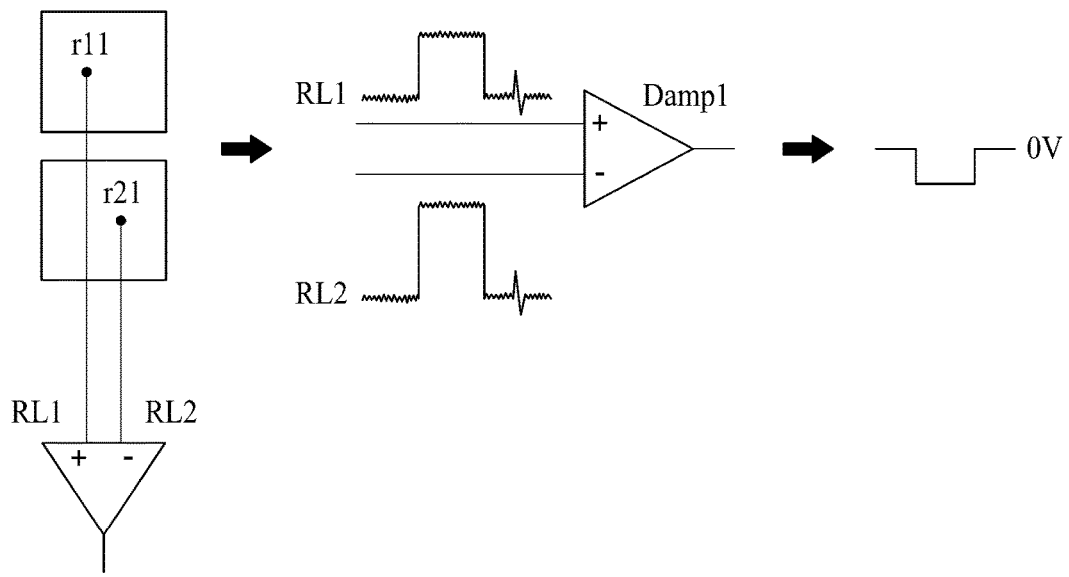
FIGS. 8A and 8B are exemplary diagrams schematically illustrating a configuration of a touch sensing unit applied to a display device according to a third embodiment of the present invention.
Figure 8B:
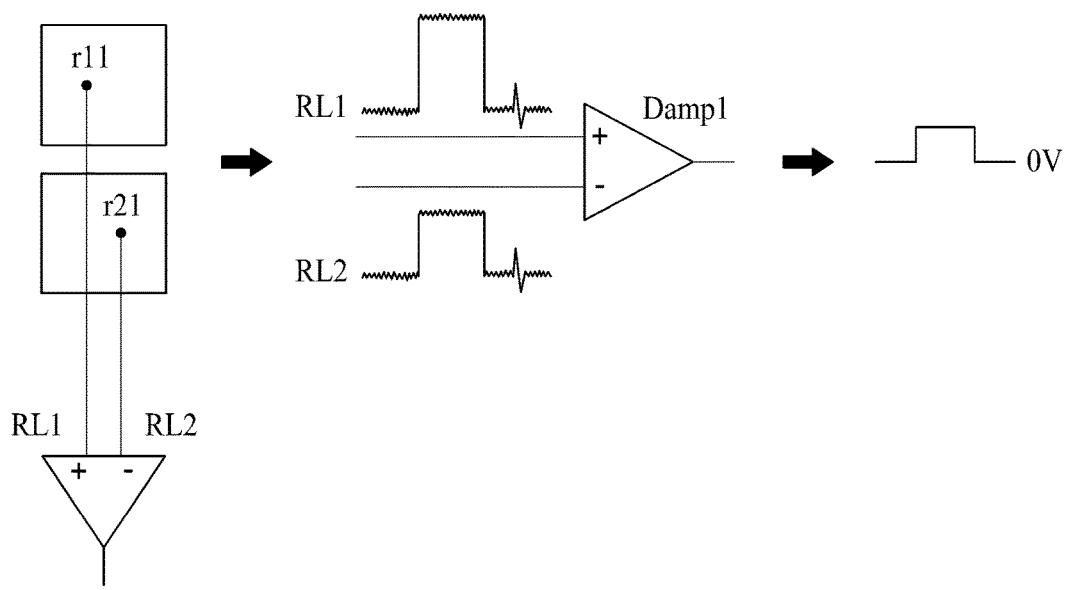

FIGS. 8A and 8B are exemplary diagrams schematically illustrating a configuration of a touch sensing unit applied to a display device according to a third embodiment of the present invention. In the following description, details which are the same as or similar to the details described above with reference to FIGS. 3, 4, 6 and 7 are not repeated or will be briefly described.

The touch receiving unit 620 configuring the touch sensing unit 600 is configured with four differential amplifiers (Damp1 to Damp4) connected to eight receiving electrodes (RX1 to RX8). When the touch driving signal is supplied to an $n^{th}$ driving electrode among the driving electrodes, the touch sensing unit 600 calculates a first coordinate value corresponding to the first direction by using position information of a receiving electrode in the first direction. Here, a sensing signal for which a differential operation is performed is received through the receiving electrode, and the sensing signal corresponds to a touch. The touch sensing unit 600 calculates a second coordinate value corresponding to the second direction by using position information of the $n^{th}$ driving electrode in the second direction, and position information of an $m^{th}$ sub receiving electrode, which is disposed between sub driving electrodes configuring the $n^{th}$ driving electrode, among the sub receiving electrodes configuring the receiving electrode. Here, the sensing signal corresponding to a touch is received through the receiving electrode. The touch sensing unit 600 is configured to determine a position, in which a touch occurs, by using the first and second coordinate values.

For example, each of the receiving electrodes shown in FIG. 7 denotes one coordinates (X, Y) configured with a first coordinate value (coordinate value of an X axis direction, for example, an abscissa axis direction in FIG. 7) and a second coordinate value (a coordinate value of a Y axis direction, for example, an ordinate axis direction in FIG. 7). That is, coordinates of r11 is (1, 1), coordinates of r21 is (1, 2), coordinates of r61 is (1, 6), coordinates of r14 is (4, 1), coordinates of r24 is (4, 2), and coordinates of r64 is (4, 6). Numbers respectively indicating sub driving electrodes r11 to r64 shown in FIG. 7 is illustrated in the order of the Y axis direction and the X axis direction. Therefore, fore numeral of each of the numbers indicating the sub receiving electrodes corresponds to the Y coordinate value of the coordinates (X, Y), and a latter numeral of each of the numbers indicating the sub receiving electrodes corresponds to the X coordinate value of the coordinates (X, Y). For example, coordinates (X, Y) of the sub receiving electrode illustrated as r64 is (4, 6), but the sub receiving electrode is illustrated as r64.

In this case, twenty-four coordinates may be set. Hereinafter, a case in which the touch sensing unit 600 calculates coordinates (1, 1) corresponding to r11 of the sub receiving electrodes will be described as an example of the present invention.

For example, when the touch driving signal is supplied to the first driving electrode (TX1), a sensing signal transferred from the first receiving electrode (RX1) is inputted to a positive (+) input terminal of a first differential amplifier (Damp1), and a sensing signal transferred from the second receiving electrode (RX2) is inputted to a negative (−) input terminal of the first differential amplifier (Damp1). The touch sensing unit 600 calculates a first coordinate value by using position information, which denotes that the first receiving electrode RX1 and the second receiving electrode are disposed at a first position from a left end in the first direction. That is, the first coordinate value is '1'.

Moreover, the touch sensing unit 600 calculates a second coordinate value by using position information of the first driving electrode (TX1) in the second direction and position information of the 1-$1^{st}$ sub receiving electrode (r11), which is disposed between sub driving electrodes (t11 and t12) configuring the first driving electrode (TX1), among sub receiving electrodes configuring the first receiving electrode (RX1), through which the sensing signal corresponding to a touch is received.

In order to calculate the second coordinate value, a case where a finger of a user touches a 1-$1^{st}$ sub receiving electrode (r11) and a case where the finger of the user touches a 2-$1^{st}$ sub receiving electrode (r21) will be compared and described as an example.

For example, if a finger touches the 1-$1^{st}$ sub receiving electrode (r11), some of a mutual capacitance of the 1-$1^{st}$ sub receiving electrode is moved through the finger, and thus, an intensity of a sensing signal is more reduced than a case where a touch does not occur.

However, since there is no touch in the 2-$1^{st}$ sub receiving electrode (r21), an intensity of a sensing signal transferred from the 2-1$^{st}$ sub receiving electrode (r21) corresponds to a basic intensity, by which it is not determined that there is a touch.

In this case, the touch sensing unit 600 includes information where a sensing signal transferred from the 1-1$^{st}$ sub receiving electrode (r11) is inputted to a positive (+) input terminal of the first differential amplifier (Damp1), and information where a sensing signal transferred from the 2-1$^{st}$ sub receiving electrode (r21) is inputted to a negative (−) input terminal.

The first differential amplifier (Damp1) outputs an intensity difference of the sensing signals transferred from the first receiving electrode (RX1) and the second receiving electrode (RX2). In this case, an output of the first differential amplifier is a negative voltage lower than 0 V. Therefore, the touch sensing unit 600 determines that there is a touch in the 1-1$^{st}$ sub receiving electrode (r11), based on a polarity of a voltage.

To provide a summary on the above described, the touch sensing unit analyzes an output of the differential amplifier, (i.e., a polarity and a voltage intensity of a sensing signal for which a differential operation is performed) to determine a receiving electrode, to which a sensing signal corresponding to a touch is occurred.

To provide an additional description, because the sensing signal is received when the touch driving signal is supplied to the first driving electrode (TX1), the touch sensing unit 600 may know that the first driving electrode (TX1) is disposed on a first line in the second direction in the touch panel 500. Moreover, the touch sensing unit 600 may know that the 1-1$^{st}$ sub receiving electrode (r11) is disposed at a higher position than the position of the 2-1$^{st}$ sub receiving electrode (r21) with respect to the second direction. Therefore, the touch sensing unit 600 may know that the position, in which a touch occurs, is a first line in the second direction, and particularly, is an upper position on the first line. Therefore, the second coordinate value is '1'.

The touch sensing unit 600 may determine a position, in which a touch occurs, by using the first coordinate value and the second coordinate value. In the above-described example, the touch sensing unit 600 may know that a touch occurs in a first position with respect to the first direction and a first position with respect to the second direction. Therefore, the touch sensing unit 600 may know that a touch occurs in coordinates (1, 1) among a total of twenty-four positions disposed in the touch panel 500.

For example, if a finger touches the 2-1 sub receiving electrode (r21), some of a mutual capacitance of the 2-1$^{st}$ receiving electrode (r21) is moved through the finger, and thus, an intensity of a sensing signal is reduced.

However, since there is no touch in the 1-1$^{st}$ sub receiving electrode (r11), an intensity of a sensing signal transferred from the 1-1$^{st}$ sub receiving electrode (r11) corresponds to a basic intensity, where it is not determined that there is a touch.

In this case, the touch sensing unit 600 has information where a sensing signal transferred from the 2-1$^{st}$ sub receiving electrode (r21) is inputted to a negative (−) input terminal of the first differential amplifier (Damp1), and information where a sensing signal transferred from the 1-1$^{st}$ sub receiving electrode (r11) is inputted to a positive (+) input terminal of the first differential amplifier (Damp1).

The first differential amplifier (Damp1) outputs an intensity difference of the sensing signals transferred from the first receiving electrode (RX1) and the second receiving electrode (RX2). In this case, an output of the first differential amplifier (Damp1) is a positive voltage higher than 0 V. Therefore, the touch sensing unit 600 determines that there is a touch in the 2-1$^{st}$ sub receiving electrode (r21), based on polarity of a voltage.

To provide an additional description, because the sensing signal is received when the touch driving signal is supplied to the first driving electrode (TX1), the touch sensing unit 600 may know that the first driving electrode (TX1) is disposed on a first line in the second direction in the touch panel 500.

Moreover, the touch sensing unit 600 may know that the 2-1$^{st}$ sub receiving electrode (r21) is disposed at a lower position than the position of the 1-1$^{st}$ sub receiving electrode (r11), with respect to the second direction. Therefore, the touch sensing unit 600 may know that the position, in which a touch occurs now, is a first line in the second direction, and particularly, is a lower position on the first line. Therefore, the second coordinate value is '2'.

In particular, a pair of receiving signals inputted to the first differential amplifier (Damp1) may include a common noise. As shown in FIGS. 8A and 8B, a touch sensitivity may decrease due to a common noise. However, according to an output signal of the first differential amplifier (Damp1), a common noise is decreased or canceled, and thus, a touch sensitivity is enhanced.

To perform the above-described function, as described above, the touch sensing unit 600 may include the touch receiving unit 620 including the touch driving unit 610 and the differential amplifiers (Damp1 to Damp4).

The touch driving unit 610 sequentially supplies the touch driving signals to the driving electrodes, and the touch receiving unit 620 receives the sensing signals from the receiving electrodes.

In this case, the above-described process of determining the touch position may be performed by the receiving unit 620, or may be performed by another element configuring the touch sensing unit 600.

Figure 9:
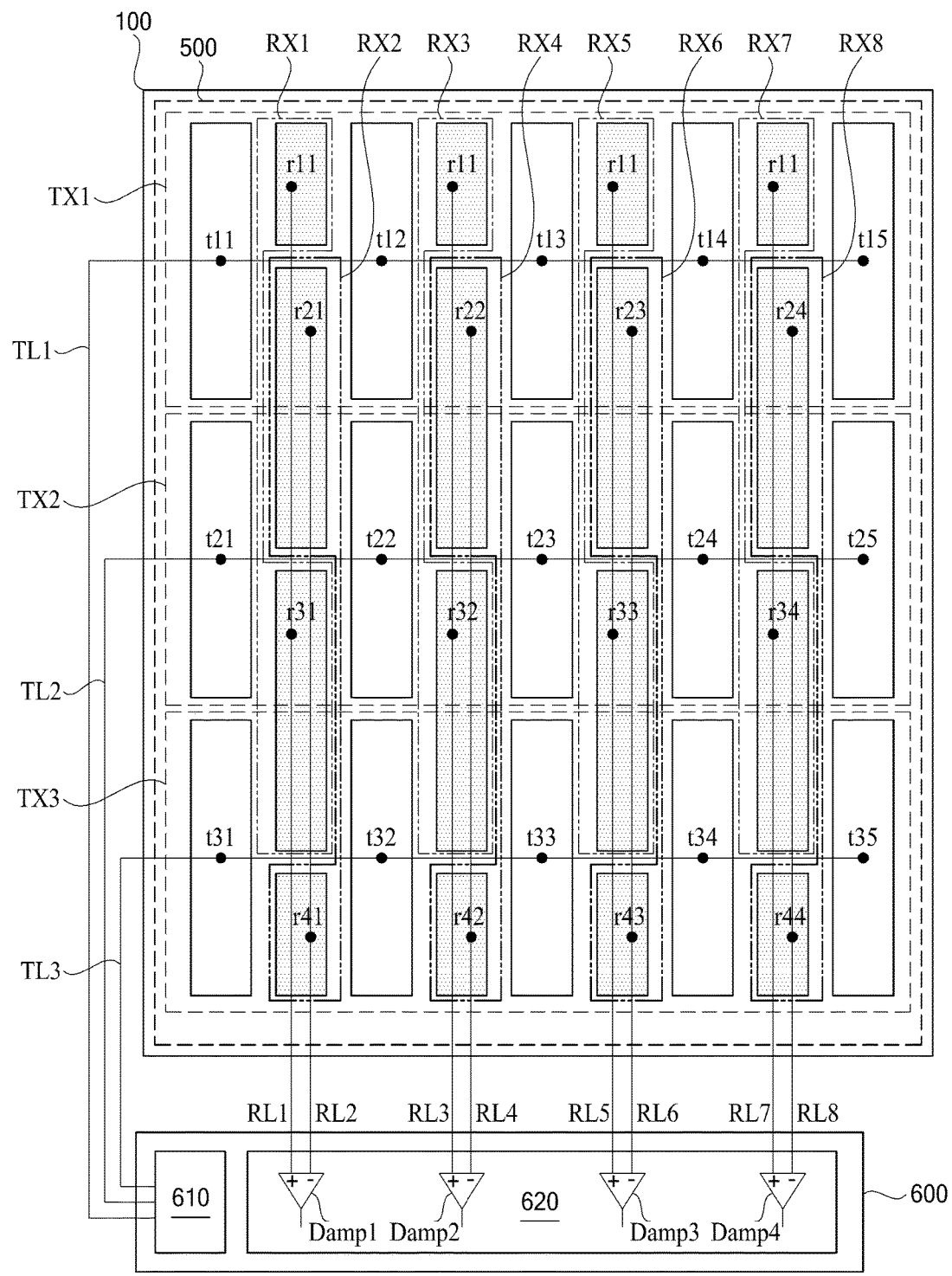
FIG. 9 is an exemplary diagram illustrating a configuration of a touch panel and a touch sensing unit applied to a display device according to a fourth embodiment of the present invention.

FIG. 9 is an exemplary diagram illustrating a configuration of a touch panel and a touch sensing unit applied to a display device according to a fourth embodiment of the present invention. The touch panel 500 includes a plurality of driving electrodes disposed in a first direction of the panel 100, and a plurality of receiving electrodes disposed in a second direction intersecting the first direction. The number of the driving electrodes and the number of the receiving electrodes may be variously changed depending on a size and a shape of the touch panel 500. In the following description, details which are the same as or similar to the details described above with reference to FIGS. 3 to 8 are not repeated or will be briefly described.

The touch panel applied to the fourth embodiment is configured with three driving electrodes (TX1 to TX3) and eight receiving electrodes (RX1 to RX8). The configuration of the touch panel 500 applied to the fourth embodiment is the same as that of the touch panel 500 applied to the third embodiment shown in FIG. 7. However, in the touch panel 500 applied to the fourth embodiment, as shown in FIG. 9, a structure of sub receiving electrodes of eight receiving electrodes (RX1 to RX8) is changed. The feature of the fourth embodiment is that one of sub receiving electrodes disposed between two sub driving electrodes configuring one driving electrode extends in the second direction, and is disposed between two sub driving electrodes configuring another driving electrode adjacent to the driving electrode.

For example, an extended 2-1$^{st}$ sub receiving electrode (r21) is disposed to correspond to the sub driving electrodes (t11, t12, t21 and t22) of the two driving electrodes (TX1 and TX2). However, since a touch driving signal is sequentially supplied to driving electrodes, an operation of the fourth embodiment is the same as that of the third embodiment.

In other words, if a touch driving signal is supplied to the first driving electrode (TX1), a sensing signal is generated in the extending 2-$1^{st}$ sub receiving electrode (r21) by the first driving electrode (t11). However, since the touch driving signal is not supplied to the second driving electrode (TX2), there is not a sensing signal which is generated by the second driving electrode (TX2).

On the other hand, if the touch driving signal is supplied to the second driving electrode (TX2), a sensing signal is generated in the extending 2-$1^{st}$ sub receiving electrode (r21) by the second driving electrode (t21). However, since a touch driving signal is not supplied to the first driving electrode (TX1), there is not a sensing signal, which is generated by the first driving electrode (TX1).

To provide a summary on the above described, the extending sub receiving electrode outputs a sensing signal according to a touch driving signal supplied to one of the two driving electrodes adjacent to each other in the second direction.

Moreover, an area of a sub receiving electrode which disposed in the second direction in the touch panel 500 according to the fourth embodiment is broader than that of a sub receiving electrode disposed in the second direction in the touch panel 500 in the third embodiment. Therefore, in the fourth embodiment, a similar common noise may be received by each of the sub receiving electrodes. To provide an additional description with reference to FIGS. 8A and 8B, when common noises which affects on a pair of receiving electrodes electrically insulated from each other, are similar to each other, differential amplifier is suitable for decreasing or canceling the common noise effectively.

To describe a difference between the present invention and the related art, a total of six touch driving signals should be sequentially supplied to six driving electrodes (TX1 to TX6) so as to determine whether there is a touch in twenty-four coordinates by using the related art touch panel shown in FIG. 2.

However, in order to determine whether there is a touch in twenty-four coordinates by using a touch panel applied to the third embodiment of the present invention shown in FIG. 7, a total of three touch driving signals are sequentially supplied to three driving electrodes (TX1 to TX3). For example, in the third embodiment of the present invention, whether there is a touch in coordinates equal to the number of coordinates which are set in the related art touch panel may be determined by using touch driving signals which are three less than the number of touch driving signals of the related art, and a common noise is reduced. Therefore, a driving time for driving the touch panel 500 is more shortened than that of the related art, and a touch sensitivity is enhanced.

To provide an additional description, in the third and fourth embodiments, when a touch driving signal is supplied to one driving electrode, whether there is a touch in two different positions may be simultaneously determined Here, the two positions are disposed along the second direction and electrically insulated from each other. Therefore, whether the touch panel 500 is wholly touched may be determined by using touch driving signals which is less than the number of driving signals of the related art. Therefore, in the display device according to the present invention, a time taken in supplying the touch driving signals to the touch panel 500 is shortened.

However, since a time taken in supplying one driving signal to one driving electrode is not shortened, a touch sensitivity of each of the driving electrodes does not decrease.

On the other hand, accumulated time taken in supplying the touch driving signals to all of the driving electrodes may decrease. Therefore, time taken in supplying the touch driving signal to each of the driving electrode may increase by time corresponding to the decreasing time, and thus, a touch sensitivity can be enhanced. In other words, the accumulated time for driving every driving electrode of the touch panel 500 can be reduced by the third and the fourth embodiments of the present invention. On the other hand, to improve the touch sensitivity of the third and the fourth embodiments, the accumulated time can be increased. To do this, each driving time for each driving electrodes can be increased. Consequently, each driving electrodes can supply touch driving signals for longer time. If the accumulated time for the first embodiment and the second embodiment are the same as the related art touch panel shown in FIG. 2, superior touch sensitivity can be achieved. Moreover, a common noise decreases by performing a differential operation on sensing signals transferred through a pair of receiving electrodes electrically insulated from each other, and thus, a touch sensitivity is further enhanced.

Moreover, when the size of the panel increases, longer receiving electrode line is required that reduces touch signal strength. However, differential amplifier may cancel the common noise. Therefore, touch sensitivity can be improved for the large size panel with the third and the fourth embodiments. In other words, the differential amplifier is configured to compensate reduction of a touch signal strength or compensate a common noise according to an increase of a length of the receiving electrode line, the length of the receiving electrode line corresponding to a size of the panel.

Figure 10:
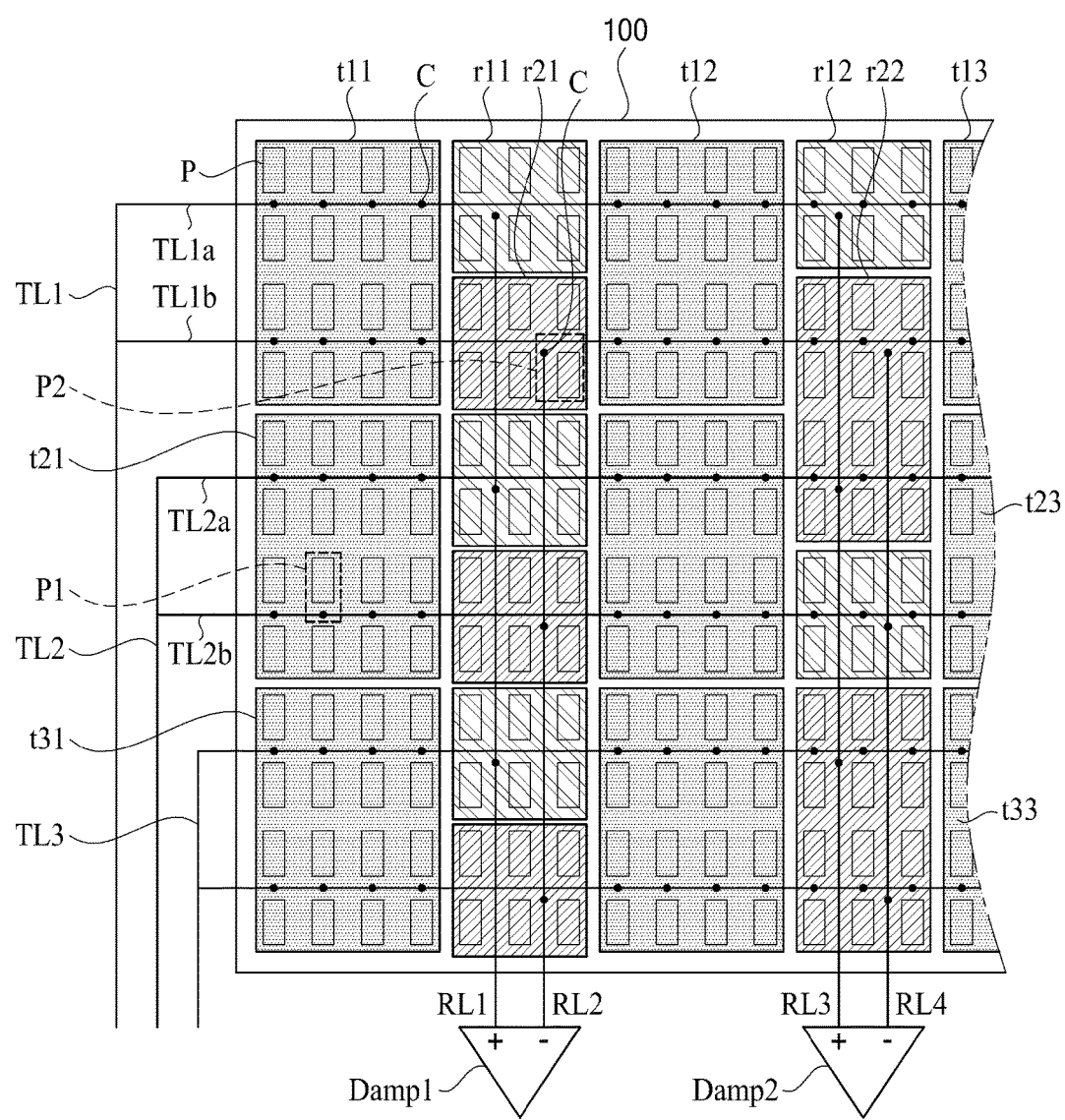
FIG. 10 is an exemplary plan view of a panel applied to a display device according to a third embodiment of the present invention.

FIG. 10 is an exemplary plan view of a panel applied to a display device according to an embodiment of the present invention, and particularly, a plan view of a touch panel applied to the third embodiment. In the following description, details which are the same as or similar to the details described above with reference to FIGS. 3, 4, 6, 7, 8A, 8B and 9 are not repeated or will be briefly described.

As described above, the touch panel 500 applied to the present invention is manufactured separately from the panel 100, and then, may be bonded to the panel 100. Also, as described above with reference to the third and fourth embodiments, the touch panel may be built into the panel 100.

An exemplary plan view of the panel 100, into which the touch panel 500 is built, is illustrated in FIG. 10. In particular, a portion of the panel 100 applied to the third embodiment of the present invention shown in FIG. 7 is illustrated in FIG. 10. For conciseness of the drawing, some reference numerals are not provided in FIG. 10.

The touch panel 500 applied to the third embodiment is configured with three driving electrodes (TX1 to TX3) and eight receiving electrodes (RX1 to RX8), and two sub receiving electrodes are disposed between two sub driving electrodes in the touch panel. A portion of the panel 100 shown in FIG. 7 is illustrated in FIG. 10.

In the panel 100, a pixel (P) is disposed in each of areas defined by intersections between the data lines and the gate lines.

Each of the sub driving electrodes (t11 to t35) and the sub receiving electrodes (r11 to r64) is disposed in an area corresponding to one or more pixels.

For example, as shown in FIG. 10, the sub driving electrode is disposed in an area corresponding to sixteen pixels, and the sub receiving electrode is disposed in an area corresponding to six pixels.

Five sub driving electrodes configuring one driving electrode, as shown in FIG. 7, may be connected to each other through one driving electrode line (TL1 or TL2 or TL3), but may be connected to each other through two dependent driving electrode lines branched from one driving electrode line as shown in FIG. 10.

For example, in FIG. 10, a first driving electrode line (TL1) configured with one line is dispose in non-display area of the panel 100, and two dependent driving electrode lines (TL1a and TL1b) branched from the first driving electrode line (TL1) are disposed in an active area of the panel 100. Five sub driving electrodes (t11, t12, t13, t14 and t15) configuring the first driving electrode (TX1) are electrically connected to each other through the two dependent driving electrode lines (TL1a and TL1b).

Therefore, in the first sub driving electrode (t11), one or more contact holes (C) connected to a first dependent driving electrode line (TL1a) and one or more contact holes (C) connected to a second dependent driving electrode line (TL1b) are provided. In the panel shown in FIG. 10, the first sub driving electrode (t11) is connected to the first dependent driving electrode line (TL1a) through four contact holes (C), and is connected to the second dependent driving electrode line (TL1b) through another four contact holes (C). An area shown as a point in FIG. 10 denotes a contact hole (C).

The driving electrode line or the dependent driving electrode line is disposed along the first direction in the active area.

When the gate line is disposed along the first direction, the driving electrode line or the dependent driving electrode line may be disposed in parallel with the gate line. In this case, the driving electrode line or the dependent driving electrode line may be disposed on the same layer as that of the gate line.

Three sub receiving electrodes configuring one receiving electrode, as shown in FIGS. 7 and 10, may be connected to each other through one receiving electrode line, but may be connected to each other through two or more dependent receiving electrode lines branched from one receiving electrode line.

For example, in FIG. 10, a first receiving electrode line (RL1) configured with one line is dispose in non-display area of the panel 100, and three sub receiving electrodes (r11, r31 and r51) configuring the first receiving electrode (RX1) are electrically connected to each other through the receiving electrode line (RL1).

In this case, in the first sub receiving electrode (r11), one or more contact holes (C) connected to the first receiving electrode line (RL1) is provided. In the panel shown in FIG. 10, the first sub receiving electrode (r11) is connected to the first receiving electrode line (RL1) through one contact hole (C). An area shown as a point in FIG. 10 denotes a contact hole (C).

The receiving electrode line is disposed along the second direction.

When the data line is disposed along the second direction, the receiving electrode line may be disposed in parallel with the data line. As another example, the receiving electrode line may be disposed to overlap the data line with an insulation layer therebetween.

The number of the contact holes (C) may be variously changed depending on an area or a size of a driving electrode and a receiving electrode.

Figure 11:
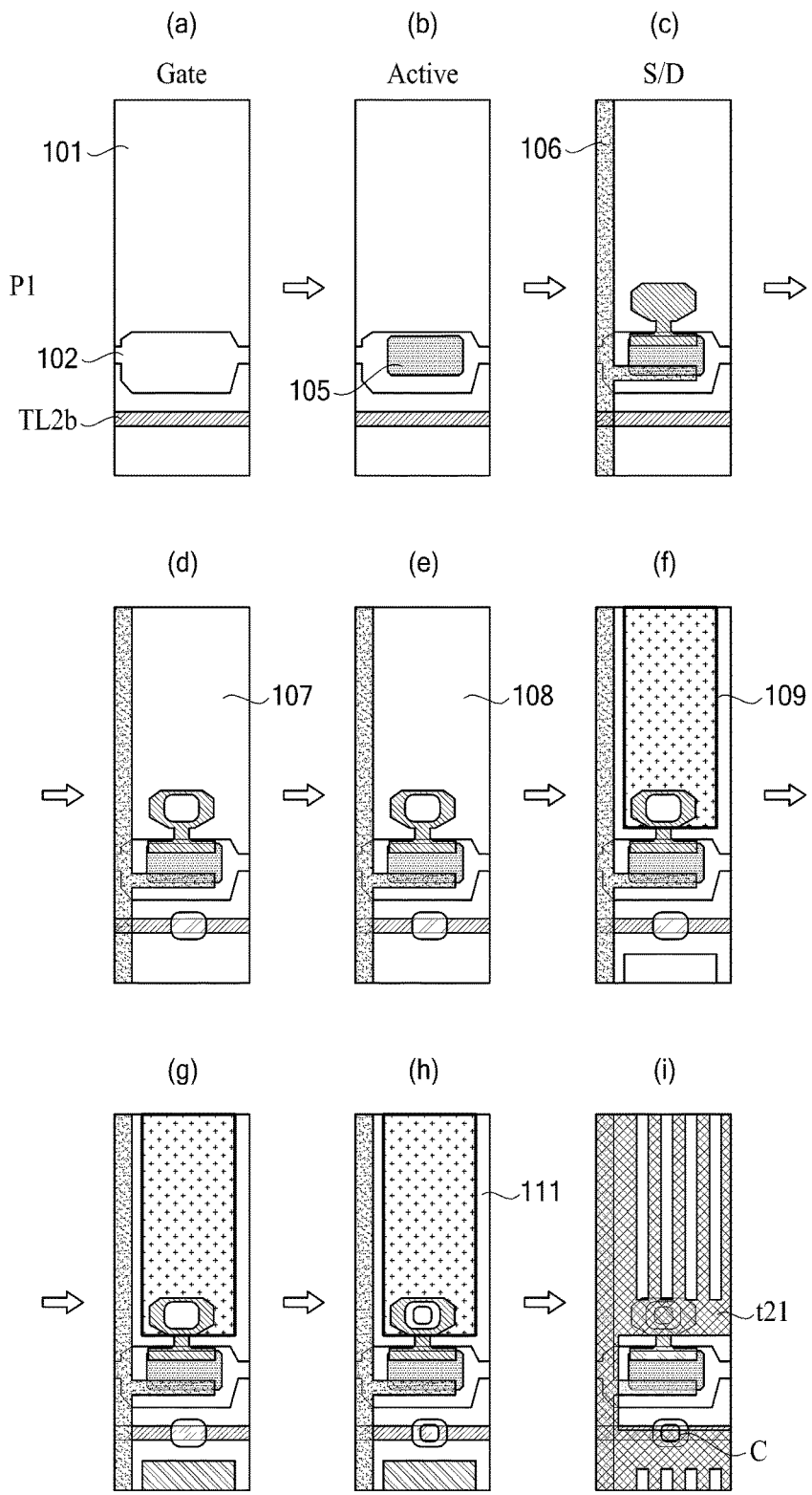
FIG. 11 is an exemplary diagram for describing a method of manufacturing a panel applied to a display device according to the present invention.
Figure 12:
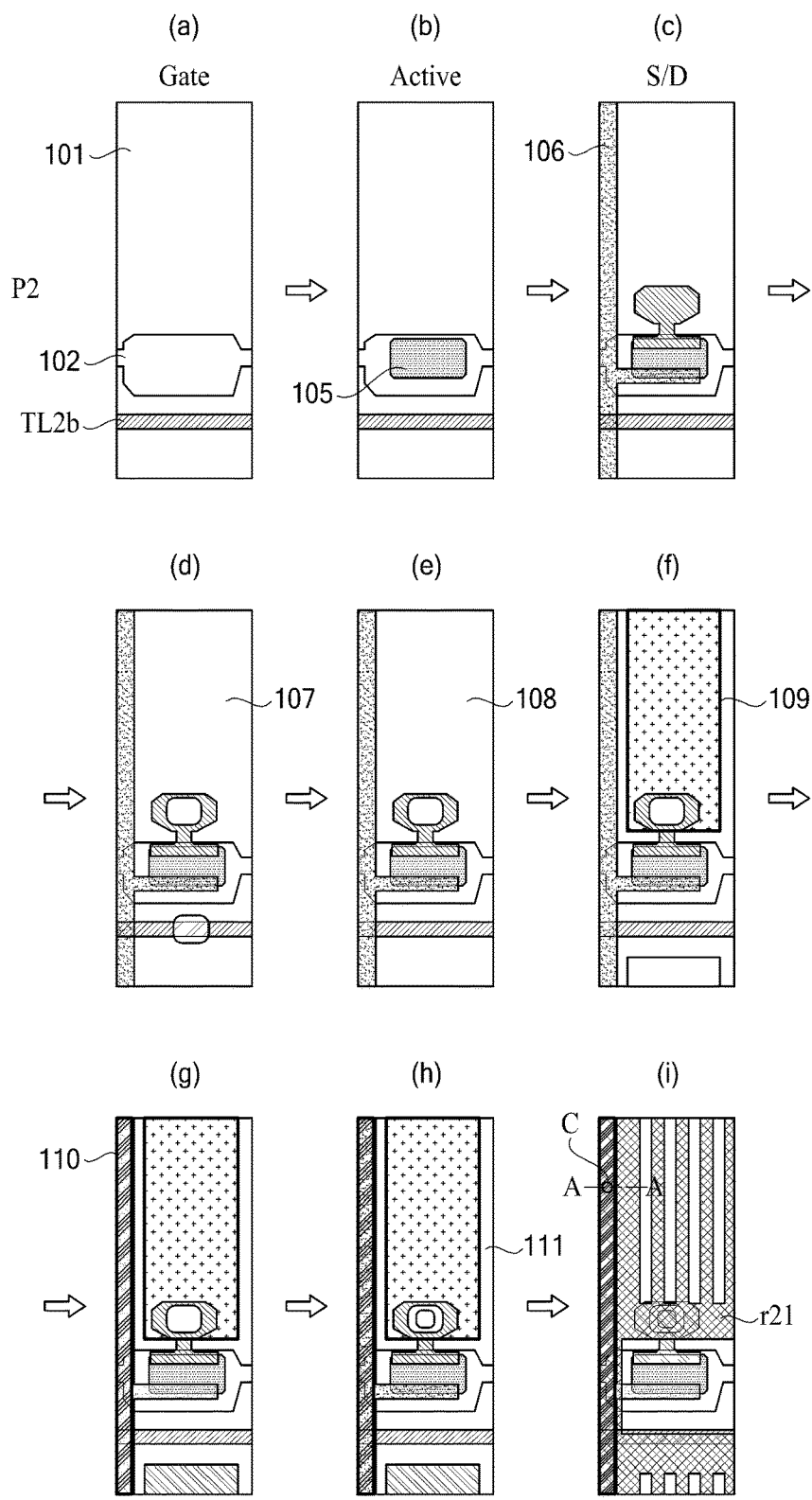
FIG. 12 is another exemplary diagram for describing a method of manufacturing a panel applied to a display device according to the present invention.
Figure 13:
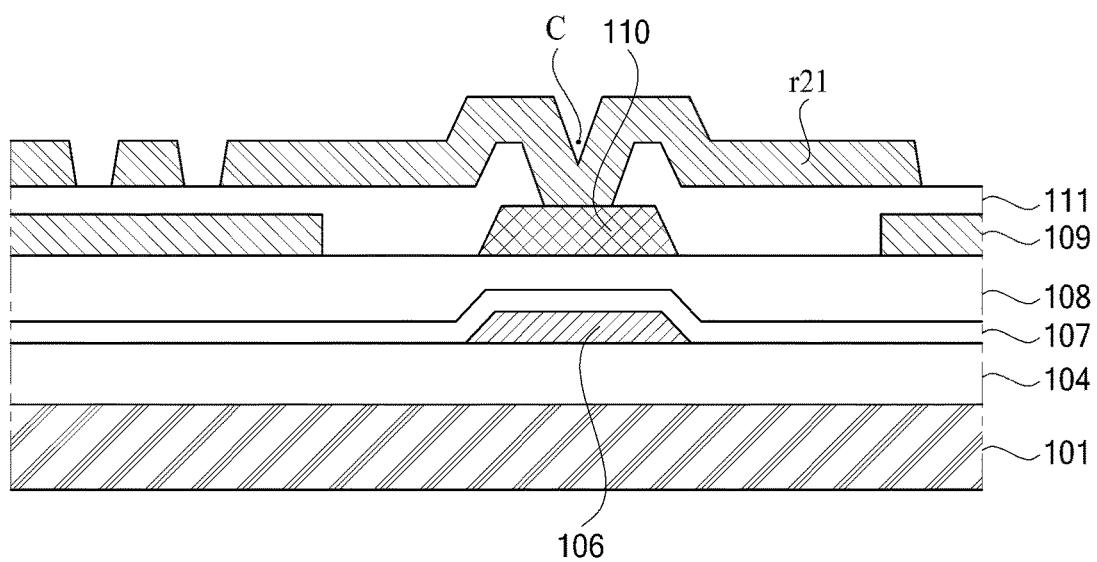
FIG. 13 is an exemplary diagram illustrating a cross-sectional surface taken along line A-A' of FIG. 12.

FIG. 11 is an exemplary diagram for describing a method of manufacturing a panel applied to a display device according to the present invention, and particularly, is an exemplary diagram for describing a method of forming a first pixel (P1), in which a first sub driving electrode (t21) configuring the second driving electrode (TX2) is disposed. FIG. 12 is another exemplary diagram for describing a method of manufacturing a panel applied to a display device according to the present invention, and particularly, is another exemplary diagram for describing a method of forming a second pixel (P2), in which a first sub receiving electrode (r21) configuring the second receiving electrode (RX2) is dispose. FIG. 13 is an exemplary diagram illustrating a cross-sectional surface taken along line A-A' of FIG. 12.

A method of manufacturing a panel applied to a display device according to the present invention will be described below with reference to FIGS. 11 to 13.

First, as shown in a portion (a) of FIG. 11 and a portion (a) of FIG. 12, a second dependent driving electrode line (TL2b) for electrically connecting sub driving electrodes (t21, t22, t23, t24 and t25), which configure a second driving electrode (TX2), a gate line and a gate electrode 102 are disposed on a base substrate 101.

Next, a gate insulation layer 104 shown in FIG. 13 is deposited on the second dependent driving electrode line (TL2b), the gate line and the gate electrode 102.

Next, as shown in a portion (b) of FIG. 11 and a portion (b) of FIG. 12, an active layer 105 is deposited on the gate electrode 102.

Next, as show in a portion (c) of FIG. 11, a portion (c) of FIG. 12 and FIG. 13, a data line 106 and a source/drain electrode are deposited.

Next, as shown in a portion (d) of FIG. 11, a portion (d) of FIG. 12 and FIG. 13, a first protective layer 107 is deposited. In this case, a thickness of the first protective layer 107 may be 0.1 μm to 0.2 μm.

Next, as shown in a portion (e) of FIG. 11, a portion (e) of FIG. 12 and FIG. 13, an organic insulation layer 108 is deposited on the first protective layer 107. In this case, a thickness of the organic insulation layer 108 may be 0.1 μm to 2 μm.

Next, as shown in a portion (f) of FIG. 11, a portion (f) of FIG. 12 and FIG. 13, a pixel electrode 109 is deposited on the organic insulation layer 108.

Next, as shown in a portion (g) of FIG. 12 and FIG. 13, the second receiving electrode line (RL2) is deposited on the organic insulation layer 108 to overlap a data line 106. In this case, a separate element is not deposited on the first pixel (P1).

Next, as shown in a portion (h) of FIG. 11, a portion (h) of FIG. 12 and FIG. 13, a second protective layer 111 is deposited.

Finally, a sub driving electrode and a sub receiving electrode are deposited in each region. In this case, the sub driving electrode is connected to a driving electrode line and the sub receiving electrode is connected to a receiving electrode line.

For example, as shown in a portion (I) of FIG. 11, a first sub driving electrode (t21) configuring a second driving electrode (TX2) is deposited in the first pixel (P1), and the first sub driving electrode (t21) is electrically connected to the second dependent driving electrode line (TL2b) through a contact hole (C).

Moreover, as shown in a portion (i) of FIG. 12 and FIG. 13, a first sub receiving electrode (r21) configuring the second receiving electrode (RX2) is deposited in the second pixel (P2), and the first sub receiving electrode (r21) is electrically connected to the second receiving electrode line (RL2) through a contact hole (C).

In this case, as described above, the second receiving electrode line (RL2) is disposed to overlap the data line disposed in the panel with a second protective layer 111 therebetween.

A contact hole connecting the first sub driving electrode (t21) to the second dependent driving electrode line (TL2b), and a contact hole connecting the first sub receiving electrode (r21) and the second receiving electrode line (RL2) may be disposed at various positions in addition to the positions shown in a portion (i) of FIG. 11, a portion (i) of FIG. 12 and FIG. 13.

Hereinafter, a method of driving a display device according to an embodiment of the present invention will be described with reference to FIGS. 3 to 13. In particular, hereinafter, the present invention will be described with reference to the first embodiment and the third embodiment.

First, the touch sensing unit 600 sequentially supplies a touch driving signal to a plurality of driving electrodes (TX1 to TX3) disposed in a first direction of the panel 100.

For example, when a touch sensing period arrives, the touch sensing unit 600 may supply the touch driving signal to the first driving electrode (TX1), supply the touch driving signal to the second driving electrode (TX2), and supply the touch driving signal to the third driving electrode (TX3).

Next, when the touch driving signal is supplied to a $n^{th}$ driving electrode among the driving electrodes, the touch sensing unit 600 receives sensing signals from at least two receiving electrodes disposed between sub driving electrodes configuring the $n^{th}$ driving electrode.

For example, a first sub receiving electrode (r11) configuring the first receiving electrode (RX1) and a first sub receiving electrode (r21) configuring the second receiving electrode (RX2) are disposed between a first sub driving electrode (t11) and a second sub driving electrode (t12), which configure the first driving electrode (TX1).

In this case, when the touch driving signal is supplied to the first driving electrode (TX1), the touch sensing unit 600 receives a sensing signal transferred from each of the two sub receiving electrodes (r11 and r21).

Finally, in the first embodiment of the present invention, the touch sensing unit 600 analyzes the sensing signals to determine whether there is a touch in at least two positions, which are disposed in a second direction vertical to the first direction, between the sub driving electrodes. Hereinafter, the method in which a sensing signal corresponding to a touch is received from a first sub receiving electrode (r11) configuring the first receiving electrode (RX1) will be described as an example of the present invention.

In the example, the touch sensing unit 600 calculates a first coordinate value corresponding to the first direction by using position information, in the first direction of the first receiving electrode (r11) in which it is determined that there is a touch. In this case, the touch sensing unit 600 knows that the first sub receiving electrode (r11) is disposed between the first sub driving electrode (t11) and the second sub driving electrode (t12). That is, the first sub receiving electrode (r11) is disposed on a first line of the first direction. Therefore, the touch sensing unit may set '1' as the first coordinate value (X).

Moreover, the touch sensing unit 600 calculates a second coordinate value corresponding to the second direction by using position information of the first sub receiving electrode (r11), which is disposed between sub driving electrodes configuring the first driving electrode, among the sub receiving electrodes configuring the first receiving electrode (RX1), through which the sensing signal corresponding to a touch is received. In this case, the position information of the first driving electrode in the second direction is used in addition to the position information of the first sub receiving electrode.

In this case, the touch sensing unit 600 may know that the first driving electrode is disposed in an uppermost position of the panel with respect to the second direction. Moreover, the touch sensing unit 600 may know that the first sub receiving electrode (r11) configuring the first receiving electrode (RX1) is disposed at a higher position than the position of the first sub receiving electrode (r21) configuring the second receiving electrode (RX1), with respect to the second direction. That is, the first sub receiving electrode (r11) is disposed in a position corresponding to the first driving electrode (TX1) disposed in an uppermost position of the panel with respect to the second direction. Moreover, the first sub receiving electrode (r11) is disposed at a higher position than the position of the first sub receiving electrode (r21) configuring the second receiving electrode (RX2), with respect to the first driving electrode (TX1). Therefore, the touch sensing unit 600 may set '1' as the second coordinate value (Y).

The touch sensing unit 600 finally determines a position, where a touch occurs, as coordinates (1, 1), by using the first coordinate value and the second coordinate value.

Moreover, in the third embodiment of the present invention, the touch sensing unit 600 performs a differential operation on the sensing signals. Then, the touch sensing unit 600 determines whether there is a touch in at least two positions, which are disposed between the sub driving electrodes and disposed in a second direction intersecting the first direction, by using a polarity and a intensity of a sensing signal for which a differential operation is performed. Hereinafter, the method, in which a sensing signal corresponding to a touch is received from a first sub receiving electrode (r11) configuring the first receiving electrode (RX1), will be described as an example of the present invention. Here, a differential operation is performed on the sensing signal.

In the example, the touch sensing unit 600 calculates a first coordinate value corresponding to the first direction by using position information of the first sub receiving electrode in the first direction. Here, a sensing signal for which a differential operation is performed, is received through the first sub receiving electrode. In this case, the touch sensing unit 600 knows that the first sub receiving electrode (r11) is disposed between the first sub driving electrode (t11) and the second sub driving electrode (t12). That is, the first sub receiving electrode (r11) is disposed in a first line of the first direction. Therefore, the touch sensing unit may set '1' as the first coordinate value (X).

Moreover, the touch sensing unit 600 calculates a second coordinate value corresponding to the second direction by using position information of the first driving electrode in the second direction, and position information of the first sub receiving electrode, which is disposed between sub driving electrodes configuring the first driving electrode, among the sub receiving electrodes configuring the first receiving electrode (RX1). Here, the sensing signal for which a differential operation is performed is received through the first receiving electrodes (RX1).

In this case, the touch sensing unit 600 may know that the first driving electrode is disposed in an uppermost position of the panel with respect to the second direction. Moreover, the touch sensing unit 600 may know that the first sub receiving electrode (r11) configuring the first receiving electrode (RX1) is disposed at a higher position than the position of the first sub receiving electrode (r21) configuring the second receiving electrode (RX1), with respect to the second direction. That is, the first sub receiving electrode (r11) is disposed in a position corresponding to the first driving electrode (TX1) disposed in an uppermost position of the panel with respect to the second direction. Moreover, the first sub receiving electrode (r11) is disposed at a higher position than the position of the first sub receiving electrode (r21) configuring the second receiving electrode (RX2) with respect to the first driving electrode (TX1). Therefore, the touch sensing unit 600 may set '1' as the second coordinate value (Y).

The touch sensing unit 600 finally determines coordinates, where a touch occurs, as (1, 1), by using the first coordinate value and the second coordinate value.

The present invention includes a panel displaying an image, a touch panel comprising a plurality of driving electrodes disposed in a first direction of the panel and a plurality of pairs of receiving electrodes disposed in a second direction intersecting the first direction, and a touch sensing unit supplying a touch driving signal to the driving electrodes and configured to determine whether there is a touch in the panel by using a plurality of pairs of sensing signals received from the plurality of pairs of receiving electrodes. The touch sensing unit includes differential amplifiers. Each of the differential amplifiers is electrically connected to the pair of the receiving electrodes so that each of the differential amplifiers performs a differential operation on a pair of the sensing signals. Each of the driving electrodes is configured with sub driving electrodes which are connected to each other through a driving electrode line. Each of the pair of the receiving electrodes is configured with sub receiving electrodes connected to each other through a receiving electrode line. Two sub receiving electrodes respectively configuring the pair of the receiving electrodes are disposed between two sub driving electrodes configuring one driving electrode.

When the touch driving signal is supplied to an $n^{th}$ driving electrode among the driving electrodes, the touch sensing unit calculates a first coordinate value corresponding to the first direction by using position information of a pair of receiving electrodes comprising at least one receiving electrode, through which a sensing signal corresponding to a touch is received, in the first direction. Here, a differential operation being performed on the sensing signal corresponding to the touch. The touch sensing unit calculates second coordinate value corresponding to the second direction by using position information of the $n^{th}$ driving electrode in the second direction, and position information of an $m^{th}$ sub receiving electrode, which is disposed between sub driving electrodes configuring the $n^{th}$ driving electrode, among the sub receiving electrodes configuring the receiving electrode, through which a sensing signal corresponding to a touch is received, in the second direction. Moreover, the touch sensing unit determines a position, in which a touch occurs, by using the first coordinate value and the second coordinate value.

One of the two sub receiving electrodes extends to the second direction, and is disposed between two sub driving electrodes configuring another driving electrode adjacent to the driving electrode.

The method according to the present invention includes sequentially supplying a touch driving signal to each of driving electrodes arranged in a first direction of a panel; receiving a pair of sensing signals from two receiving electrodes disposed between two sub driving electrodes configuring the $n^{th}$ driving electrode among sub driving electrodes configuring the $n^{th}$ driving electrodes, when the touch driving signal is supplied to the $n^{th}$ driving electrode among the driving electrodes; performing a differential operation of the pair of the receiving electrodes; and analyzing the sensing signals, on which a differential operation is performed, to determine whether there is a touch in two positions disposed along second direction intersecting the first direction, between the sub driving electrodes.

The receiving of the sensing signal receives a sensing signal from each of two sub receiving electrodes, which are disposed between two sub driving electrodes configuring the nth driving electrode and respectively configures a pair of receiving electrodes electrically insulated from each other.

Meanwhile, the features of the embodiments may be also described as follows.

A touch electrode arrangement (for example shown in FIGS. 4 to 13) comprising driving electrode sections (for example shown in FIG. 4, t11 to t35) arranged in a row direction (for example shown in FIG. 4, TX1 to TX3) and sensing electrode sections (for example shown in FIG. 4, r11 to r64) arranged in a column direction (for example shown in FIG. 4, RL1 to RL8) with at least two sensing electrode sections insulated from each other located between two adjacent driving electrode sections.

A touch electrode arrangement comprising driving electrode sections arranged in a row direction; and sensing electrode sections arranged in a column direction with at least two sensing electrode sections insulated from each other located between two adjacent driving electrode sections.

The touch electrode arrangement, wherein the driving electrode sections are disposed on a first substrate and the sensing electrode sections are disposed on a second substrate.

The touch electrode arrangement, wherein at least one of the first substrate and the second substrate is one among a glass substrate, a color filter substrate, a polarizer and a cover glass.

The touch electrode arrangement, wherein the driving electrode sections and the sensing electrode sections are disposed on a base substrate.

The touch electrode arrangement, wherein the driving electrode sections and the sensing electrode sections are connected to a differential amplifiers to cancel common noise.

A system (for example shown in FIG. 3 in combination with FIGS. 4 to 13) comprising a panel configured to display an image; a touch array comprising a plurality of driving electrodes and receiving electrodes; and a touch sensing unit configured to supply a touch driving signal to the driving electrodes, and configured to detect touch operations on the panel by using sensing signals received from the receiving electrodes, wherein each driving electrode comprises sub-driving electrodes, which are disposed in a first direction of the panel and connected to each other through a driving electrode line, each receiving electrode comprises sub-receiving electrodes, which are disposed in a second direction perpendicular to the first direction and connected to each other through a receiving electrode line, and at least two sub-receiving electrodes, respectively insulated from each other, are disposed between two adjacent sub-driving electrodes.

The system, wherein at least two sub receiving electrodes disposed between the two sub driving electrodes are arranged in a row along the second direction.

The touch electrode arrangement or the system further respectively comprising a plurality of differential amplifiers, each of which is electrically connected to a pair of sensing electrode sections, wherein each of the differential amplifier is configured to perform a differential operation on a pair of sensing signals received through a pair of receiving electrode lines; or a plurality of differential amplifiers, each of which is electrically connected to a pair of receiving electrode lines, wherein each of the differential amplifier is configured to perform a differential operation on a pair of the sensing signals received through the pair of the receiving electrode lines.

The touch electrode arrangement, wherein the driving electrode sections and the sensing electrode sections are disposed on a base substrate or the driving electrode sections are disposed on a first substrate and the sensing electrode sections are disposed on a second substrate, and wherein at least one of the base substrate, the first substrate and the second substrate is one among a glass substrate, a color filter substrate, a polarizer and a cover glass.

The touch electrode arrangement, wherein three or more sensing electrode sections arranged in a column direction and insulated from each other located between two adjacent driving electrode sections, or the system, wherein at least three sub-receiving electrodes, respectively insulated from each other, are disposed between two adjacent sub-driving electrodes.

The touch electrode arrangement, wherein one sensing electrode section among the at least two sensing electrode sections corresponding to a first row of driving electrode sections, is electrically connected to one sensing electrode among the at least two sensing electrode sections corresponding to a second row of driving electrode sections or the system, wherein one of the sub receiving electrodes disposed between two sub driving electrodes configuring one driving electrode extends to the second direction, and is disposed between two sub driving electrodes configuring another driving electrode adjacent to the driving electrode.

The system, wherein the sub-driving electrode is disposed with an insulation layer between the sub-driving electrode and the driving electrode line, the sub-receiving electrode is disposed with the insulation layer between the sub-receiving electrode and the receiving electrode line, the sub-driving electrode is connected to the driving electrode line through a contact hole provided in the insulation layer; and the sub-receiving electrode is connected to the receiving electrode line through a contact hole provided in the insulation layer.

The system, wherein sub-receiving electrodes respectively configuring at least two receiving electrodes are alternately arranged along the column direction.

The system, wherein the receiving electrode lines disposed between adjacent sub-driving electrodes are disposed to overlap the sub-receiving electrodes alternately arranged along the column direction.

A method of driving a display device, the method comprising supplying a touch driving signal to each driving electrode arranged in a first direction of a panel; receiving sensing signals from at least two receiving electrodes disposed between two sub-driving electrodes configuring an nth driving electrode among sub-driving electrodes configuring the nth driving electrodes, when the touch driving signal is supplied to the nth driving electrode among the driving electrodes; and analyzing the sensing signals to determine whether there is a touch operation in at least two positions disposed along second direction perpendicular to the first direction, between the two sub-driving electrodes.

The method, wherein the receiving of the sensing signal receives a sensing signal from each of the at least two sub-receiving electrodes, which are disposed between two sub-driving electrodes among sub-driving electrodes configuring the nth driving electrode and are electrically insulated from each other.

The method, wherein the analyzing of the sensing signals comprises calculating a first coordinate value corresponding to the first direction by using position information of a receiving electrode, in which it is determined that there is a touch operation, in the first direction; calculating second coordinate value corresponding to the second direction by using position information of the $n^{th}$ driving electrode in the second direction, and position information of an $m^{th}$ sub receiving electrode, which is disposed between sub-driving electrodes configuring the $n^{th}$ driving electrode, among the sub-receiving electrodes configuring the receiving electrode, through which a sensing signal corresponding to a touch operation is received, in the second direction; and determining a position, in which the touch operation occurs, by using the first coordinate value and the second coordinate value.

The method, wherein the receiving of the sensing signal receives a pair of sensing signals from two sub-receiving electrodes, which are disposed between two sub-driving electrodes among sub-driving electrodes configuring the nth driving electrode, and the analyzing of the sensing signals analyzes sensing signals, on which a differential operation is performed through a differential amplifier connected to a pair of receiving electrodes, to determine whether there is a touch operation in two positions disposed along second direction intersecting the first direction, between the sub-driving electrodes.

The method, wherein the receiving of the sensing signal receives a sensing signal from each of two sub-receiving electrodes, which are disposed between two sub-driving electrodes configuring the nth driving electrode and respectively configures a pair of receiving electrodes.

According to the present invention, touch is sensed two or more times faster than a related art method, and thus, a performance of a touch panel can be enhanced.

Moreover, the present invention facilitates a time division driving operation, and thus is suitable for an in-cell type display device, in which a sensing time is insufficient. According to the present invention, a touch sensing function of the in-cell type display device can be enhanced, and an in-cell type display device having a large screen with a touch panel provided therein can be provided.

Moreover, according to the present invention, at least two receiving electrodes electrically insulated from each other are provided between adjacent sub driving electrodes, and thus, a touch sensitivity can be enhanced by two receiving electrodes. Also, according to the present invention, at least two receiving electrodes electrically insulated from each other are provided between adjacent sub driving electrodes, and two sensing signals are detected by one touch driving signal supplied to a driving electrode. Therefore, a touch is sensed two or more times faster than the related art method.

Moreover, the in-cell type display device having a large screen can be provided by compensating for a reduction in strength of a touch signal or compensating for a common noise with a differential amplifier connected to a receiving electrode.

It will be apparent to those skilled in the art that various modifications and variations can be made without departing from the scope of the embodiments of the invention. Thus, it is intended that the disclosed inventive concepts cover such modifications and variations provided they come within the scope of the appended claims and their equivalents.

What is claimed is:

1. A display device, comprising:
a panel configured to display an image;
a touch array comprising a plurality of driving electrodes and receiving electrodes; and
a touch sensing unit configured to supply a touch driving signal to the driving electrodes, and configured to detect touch operations on the panel by using sensing signals received from the receiving electrodes,
wherein each driving electrode comprises sub-driving electrodes, which are disposed in a first direction of the panel and connected to each other through a driving electrode line,
wherein each receiving electrode comprises sub-receiving electrodes, which are disposed in a second direction perpendicular to the first direction and connected to each other through a receiving electrode line,
wherein at least two sub-receiving electrodes, respectively insulated from each other, are disposed between two adjacent sub-driving electrodes, and
wherein sub-receiving electrodes that respectively configure at least two receiving electrodes are alternately arranged along the second direction such that sub-receiving electrodes adjacent to each other in the second direction and respectively configuring the at least two receiving electrodes are not electrically connected to each other, and
the receiving electrode line connected to the sub-receiving electrodes configuring one receiving electrode overlaps the sub-receiving electrodes that respectively configure the at least two receiving electrodes and are alternately arranged along the second direction.

2. The display device of claim 1,
wherein at least two sub-receiving electrodes disposed between the two sub-driving electrodes are arranged in a row along the second direction.

3. The display device of claim 2,
wherein sub-receiving electrodes configuring one receiving electrode among the sub-receiving electrodes are connected to each other through one receiving electrode line.

4. The display device of claim 3, further comprising:
a plurality of differential amplifiers, each of which is electrically connected to a pair of receiving electrode lines,
wherein each differential amplifier is configured to perform a differential operation on a pair of the sensing signals received through the pair of the receiving electrode lines.

5. The display device of claim 4,
wherein each differential amplifier is configured to compensate for a reduction of a touch signal strength or compensate for a common noise according to an increase of a length of the receiving electrode line, the length of the receiving electrode line corresponding to a size of the panel.

6. The display device of claim 1,
wherein the touch array is adhered to the panel or is integrated into the panel.

7. The display device of claim 1, wherein,
when the touch driving signal is supplied to an $n^{th}$ driving electrode among the driving electrodes, the touch sensing unit calculates a first coordinate value corresponding to the first direction by using position information of a receiving electrode, in which it is determined that there is a touch operation, in the first direction,
the touch sensing unit calculates a second coordinate value corresponding to the second direction by using position information of the $n^{th}$ driving electrode in the second direction, and position information of an $m^{th}$ sub-receiving electrode, which is disposed between sub-driving electrodes configuring the $n^{th}$ driving electrode, among the sub-receiving electrodes configuring the receiving electrode, through which a sensing signal corresponding to a touch operation is received, in the second direction; and
the touch sensing unit determines a position, in which the touch operation occurs, by using the first coordinate value and the second coordinate value.

8. The display device of claim 7, wherein,
the sub-driving electrode is disposed with the insulation layer between the sub-driving electrode and the driving electrode line, and
the sub-driving electrode is connected to the driving electrode line through a contact hole provided in the insulation layer.

9. The display device of claim 1, wherein,
a gate line, a data line, and a gate insulation layer deposited on the gate line are disposed in the panel,
the driving electrode line is disposed in the same layer as that of the gate line, and
the receiving electrode line is disposed to overlap the data line with the insulation layer therebetween.

10. The display device of claim 1, wherein,
two sub-receiving electrodes respectively configuring a pair of receiving electrodes are disposed between two sub-driving electrodes configuring one driving electrode,
the touch sensing unit supplies a touch driving signal to each of the driving electrodes, and
the touch sensing unit determines whether there is a touch operation in the touch array, by using a pair of sensing signals received from the pair of the receiving electrodes.

11. The display device of claim 10, wherein,
when the touch driving signal is supplied to an $n^{th}$ driving electrode among the driving electrodes, the touch sensing unit calculates first coordinate value corresponding to the first direction by using position information of a pair of receiving electrodes comprising one receiving electrode, through which a sensing signal corresponding to a touch operation is received, in the first direction, a differential operation being performed on the sensing signal corresponding to the touch operation,
the touch sensing unit calculates second coordinate value corresponding to the second direction by using position information of the $n^{th}$ driving electrode in the second direction, and position information of an $m^{th}$ sub-receiving electrode, which is disposed between sub-driving electrodes configuring the $n^{th}$ driving electrode, among the sub-receiving electrodes configuring the receiving electrode, through which a sensing signal corresponding to a touch operation is received, in the second direction; and the touch sensing unit determines a position, in which the touch operation occurs, by using the first coordinate value and the second coordinate value.

12. The display device of claim 10,
wherein one of the two sub-receiving electrodes extends to the second direction, and is disposed between two sub-driving electrodes configuring another driving electrode adjacent to the $n^{th}$ driving electrode.

13. The display device of claim 1, wherein the receiving electrode lines disposed between adjacent sub-driving electrodes are disposed to overlap, in plan view, the sub-receiving electrodes alternately arranged along the second direction, and alternately connect to the sub-receiving electrodes alternately arranged along the column direction through contact holes.

14. The display device of claim 1,
wherein three sub-receiving electrodes, respectively insulated from each other, are disposed between two adjacent sub-driving electrodes.

15. A method of driving a display device, the method comprising:
supplying a touch driving signal to each driving electrode arranged in a first direction of a panel;
receiving sensing signals from at least two receiving electrodes disposed between two sub-driving electrodes configuring an $n^{th}$ driving electrode among sub-driving electrodes configuring the $n^{th}$ driving electrodes, when the touch driving signal is supplied to the $n^{th}$ driving electrode among the driving electrodes; and
analyzing the sensing signals to determine whether there is a touch operation in at least two positions disposed along a second direction perpendicular to the first direction, between the two sub-driving electrodes,
wherein sub-receiving electrodes that respectively configure the at least two receiving electrodes are alternately arranged along the second direction such that sub-receiving electrodes adjacent to each other in the second direction and respectively configuring the at least two receiving electrodes are not electrically connected to each other, and
a receiving electrode line connected to sub-receiving electrodes configuring one receiving electrode overlaps the sub-receiving electrodes that respectively configure the at least two receiving electrodes and are alternately arranged along the second direction.

16. The method of claim 15, wherein the receiving of the sensing signal receives a sensing signal from each of the at least two sub-receiving electrodes, which are disposed between two sub-driving electrodes among sub-driving electrodes configuring the $n^{th}$ driving electrode and are electrically insulated from each other.

17. The method of claim 15, wherein the analyzing of the sensing signals comprises:
calculating a first coordinate value corresponding to the first direction by using position information of a receiving electrode, in which it is determined that there is a touch operation, in the first direction;
calculating second coordinate value corresponding to the second direction by using position information of the $n^{th}$ driving electrode in the second direction, and position information of an $m^{th}$ sub receiving electrode, which is disposed between sub-driving electrodes configuring the $n^{th}$ driving electrode, among the sub-receiving electrodes configuring the receiving electrode, through which a sensing signal corresponding to a touch operation is received, in the second direction; and determining a position, in which the touch operation occurs, by using the first coordinate value and the second coordinate value.

18. The method of claim 15, wherein,
the receiving of the sensing signal receives a pair of sensing signals from two sub-receiving electrodes, which are disposed between two sub-driving electrodes among sub-driving electrodes configuring the $n^{th}$ driving electrode, and
the analyzing of the sensing signals analyzes sensing signals, on which a differential operation is performed through a differential amplifier connected to a pair of receiving electrodes, to determine whether there is a touch operation in two positions disposed along second direction intersecting the first direction, between the sub-driving electrodes.

19. The method of claim 15, wherein the receiving of the sensing signal receives a sensing signal from each of two sub-receiving electrodes, which are disposed between two sub-driving electrodes configuring the $n^{th}$ driving electrode and respectively configures a pair of receiving electrodes.

20. The method of claim 15, wherein the receiving electrode lines disposed between adjacent sub-driving electrodes are disposed to overlap, in plan view, the sub-receiving electrodes alternately arranged along the second direction, and alternately connect to the sub-receiving electrodes alternately arranged along the column direction through contact holes.

21. A touch panel, comprising:
a driving electrode comprising a plurality of sub-driving electrodes arranged in a row direction; and
a receiving electrode comprising a plurality of sub-receiving electrodes arranged in a column direction,
wherein at least two sub-receiving electrodes electrically insulated from each other are disposed between two adjacent sub-driving electrodes, and
wherein sub-receiving electrodes that respectively configure at least two receiving electrodes are alternately arranged along the column direction such that sub-receiving electrodes adjacent to each other in the column direction and respectively configuring the at least two receiving electrodes are not electrically connected to each other, and
a receiving electrode line connected to sub-receiving electrodes configuring one receiving electrode overlaps the sub-receiving electrodes that respectively configure the at least two receiving electrodes and are alternately arranged along the second direction.

22. The touch panel of claim 21, wherein,
the sub-driving electrodes are electrically connected to each other through a driving electrode line, and
the sub-receiving electrodes are electrically connected to each other through a receiving electrode line.

23. The touch panel of claim 22, wherein,
the sub-driving electrode is disposed with an insulation layer between the sub-driving electrode and the driving electrode line,
the sub-receiving electrode is disposed with the insulation layer between the sub-receiving electrode and the receiving electrode line,
the sub-driving electrode is connected to the driving electrode line through a contact hole provided in the insulation layer; and the sub-receiving electrode is connected to the receiving electrode line through a contact hole provided in the insulation layer.

24. The touch panel of claim 21, wherein the receiving electrode lines disposed between adjacent sub-driving electrodes are disposed to overlap, in plan view, the sub-receiving electrodes alternately arranged along the column direction, and alternately connect to the sub-receiving electrodes alternately arranged along the column direction through contact holes.

* * * * *